US008644766B2

(12) United States Patent
Fujino et al.

(10) Patent No.: US 8,644,766 B2
(45) Date of Patent: Feb. 4, 2014

(54) RADIO COMMUNICATION SYSTEM, TRANSMISSION DEVICE, RECEPTION DEVICE, RADIO COMMUNICATION METHOD, TRANSMISSION METHOD, RECEPTION METHOD

(75) Inventors: Yosuke Fujino, Tokyo (JP); Daisei Uchida, Tokyo (JP); Takafumi Fujita, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 761 days.

(21) Appl. No.: 12/988,417

(22) PCT Filed: Apr. 21, 2009

(86) PCT No.: PCT/JP2009/057904
§ 371 (c)(1),
(2), (4) Date: Oct. 18, 2010

(87) PCT Pub. No.: WO2009/131110
PCT Pub. Date: Oct. 29, 2009

(65) Prior Publication Data
US 2011/0039588 A1 Feb. 17, 2011

(30) Foreign Application Priority Data

Apr. 21, 2008 (JP) ................................. 2008-110750

(51) Int. Cl.
*H04B 17/00* (2006.01)
(52) U.S. Cl.
USPC ....................................................... 455/67.11
(58) Field of Classification Search
USPC ......... 455/67.11, 67.17, 62, 69, 71, 500, 119,
455/42, 126, 205, 226.1, 227–229, 246.1
See application file for complete search history.

(56) References Cited

U.S. PATENT DOCUMENTS

| 5,537,443 | A  | * | 7/1996  | Yoshino et al.   | 375/340 |
| 6,496,535 | B2 | * | 12/2002 | Xu               | 375/219 |
| 7,496,152 | B2 | * | 2/2009  | Nagatani et al.  | 375/296 |

FOREIGN PATENT DOCUMENTS

JP            07-202855 A      8/1995
(Continued)

OTHER PUBLICATIONS

Minn, Hlaing, et al., "Estimation of Carrier-Frequency Offset and Frequency-Selective Channels in MIMO OFDM Systems Using A Common Training Signal," Proc. of WNCG Wireless Networking Symposium, Oct. 20, 2004.

(Continued)

*Primary Examiner* — Eugene Yun
(74) *Attorney, Agent, or Firm* — Harness, Dickey & Pierce, P.L.C.

(57) ABSTRACT

A radio communication system includes a transmission device which transmits a plurality of radio signals, and a reception device which receives the plurality of radio signals from the transmission device and estimates, as a carrier frequency offset, a difference between a carrier frequency transmitted by the transmission device and a reference reception frequency used for reception. The system includes the transmission device which branches a first previously determined sequence of training signals, and transmits the radio signals modulated with frequencies by the carrier frequency offsets having regularity for a first sequence of a plurality of branched training signals, and the reception device which estimates the carrier frequency offset with the transmission device according to the first sequence of training signals included in the radio signals transmitted from the transmission device and phase shift amounts obtained from the first previously determined sequence of training signals.

22 Claims, 12 Drawing Sheets

(56) References Cited

FOREIGN PATENT DOCUMENTS

| | | |
|---|---|---|
| JP | 08-242260 A | 9/1996 |
| JP | 2004-07280 A | 1/2004 |
| JP | 2004-201338 A | 7/2004 |
| JP | 2007-013431 A | 1/2007 |
| JP | 2008-153762 A | 7/2008 |
| JP | 2009-177341 A | 8/2009 |

OTHER PUBLICATIONS

Barhumi, Imad, et al., "Optimal Training Design for MIMO OFDM Systems in Mobile Wireless Channels," IEEE Transactions on Signal Processing, vol. 51, No. 6, Jun. 2003, pp. 1615-1624.

Notice of Reasons for Rejection, Japanese Patent Application No. 2010-509181, Jan. 22, 2013.

Morikura, Masahiro, et al., "Revised version 802.11 High-speed Wireless LAN Textbook," Impress, pp. 204-205, 2005.

* cited by examiner

RADIO COMMUNICATION SYSTEM, TRANSMISSION DEVICE, RECEPTION DEVICE, RADIO COMMUNICATION METHOD, TRANSMISSION METHOD, RECEPTION METHOD

TECHNICAL FIELD

The present invention relates to a radio communication system, a transmission device, a reception device, a radio communication method, a transmission method, and a reception method.

Priority is claimed on Japanese Patent Application No. 2008-110750, filed Apr. 21, 2008, the content of which is incorporated herein by reference.

BACKGROUND ART

A digital radio communication system uses a modulation system such as phase shift keying (PSK) or quadrature amplitude modulation (QAM) in order to improve frequency use and transmission characteristics.

In the PSK or QAM modulation system, information is loaded on a phase for modulation. Accordingly, when there is a carrier frequency offset due to a frequency offset in transmitters at a transmitting side and a receiving side, transmission characteristics are greatly degraded by phase rotation due to the carrier frequency offset.

In order to avoid the degradation of the transmission characteristics due to the carrier frequency offset, the PSK or QAM modulation system requires estimating the carrier frequency offset and correcting the offset in the transmitter using any means.

Methods of estimating a carrier frequency offset includes a method of estimating a carrier frequency offset using a previously determined sequence of training signals, and a blind method not requiring training signals.

The blind method can realize high transmission efficiency since the training signals are unnecessary. However, the carrier frequency offset cannot be estimated in a short time.

Accordingly, a radio communication system that performs burst transmission in which the carrier frequency offset is required to be estimated in a short time uses the method of estimating a carrier frequency offset using a previously determined sequence of training signals (Non-patent Document 1).

FIG. 15 is a diagram showing a transmission device 5 and a reception device 6 in a radio communication system 300. The radio communication system 300 using a method of estimating a carrier frequency offset using a known sequence of training signals shown in Non-patent Document 1 will be described with reference to FIG. 15. The radio communication system 300 includes the transmission device 5 and the reception device 6.

The transmission device 5 includes a training signal sequence generation unit 51, a radio unit 52, and a transmitting antenna 53.

The training signal sequence generation unit 51 generates a previously determined sequence of training signals.

The radio unit 52 performs analog conversion and frequency conversion on the training signals generated by the training signal sequence generation unit 51, and transmits a radio signal from the transmitting antenna 53 to the reception device 6.

The reception device 6 includes a receiving antenna 61, a radio unit 62, a phase difference detection unit 63, an averaging unit 64, and a frequency estimation unit 65.

The receiving antenna 61 receives the radio signal transmitted from the transmission device 5.

The radio unit 62 performs frequency conversion and digital conversion on the radio signal received by the receiving antenna 61 to generate a reception signal.

The phase difference detection unit 63 compares the reception signal with training signals that are based on a previously determined sequence, and detects physical amounts including effects of noise obtained depending on phase shift amounts for a period of time. In Non-patent Document 1, the training signals are a sequence of signals repeated at intervals of 0.8 μs, and the reception signal is delayed 0.8 μs to detect the physical amounts that are a function of phase shift amounts for 0.8 μs.

The averaging unit 64 averages the physical amounts detected by the phase difference detection unit 63 in order to avoid the effects of the noise.

The frequency estimation unit 65 estimates a carrier frequency offset from the averaged physical amount obtained by the averaging unit 64.

Next, an operational principle of a conventional method of estimating a carrier frequency offset will be described using formulas.

Symbol n denotes a sample number, and symbol s(n) denotes the training signal generated by the training signal sequence generation unit 51. A reception signal y(n) obtained through the reception in the receiving antenna 61, the frequency conversion in the radio unit 62, and the digital conversion in the radio unit 62 is expressed by Formula 1.

[Formula 1]

$$y(n) = s(n) \cdot \exp\left(j \cdot 2\pi \cdot \frac{\Delta f}{f_s} \cdot n\right) \cdot h + \eta(n) \quad (1)$$

Here, symbol h denotes a complex amplitude response between the transmitting antenna 53 and the receiving antenna 61. Symbol $\Delta f$ denotes a carrier frequency offset between the transmission device 5 and the reception device 6. Symbol $f_s$ denotes a sampling frequency. Symbol $\eta(n)$ is a noise independent for each sample and dependent on a complex Gaussian distribution in which an average power amount is 1.

For simplification of explanation, it is assumed hereinafter that an absolute value (|s(n)|) of the training signal s(n) for each sample is 1.

The phase difference detection unit 63, the averaging unit 64, and the frequency estimation unit 65 estimate a carrier frequency offset $\Delta f$ using the reception signal y(n) generated from the received radio signal and the training signal s(n) generated by the training signal sequence generation unit 51.

The training signal s(n) is a training signal that is based on a previously determined signal sequence.

When the phase difference detection unit 63 uses delay-detection-type phase difference detection, that is, when a conjugate complex number of a delay detection result in a time difference τ sample of the reception signal y(n) is multiplied by a conjugate complex number of a delay detection result in a time difference τ sample of the training signal s(n), a physical amount z(n) that is a function of phase shift amounts in the time difference τ sample is expressed by Formula 2.

[Formula 2]

$$z(n) = s^*(n) \cdot s(n-\tau) \cdot y(n) \cdot y^*(n-\tau) \quad (2)$$
$$= \exp\left(j \cdot 2\pi \cdot \frac{\Delta f}{f_s} \cdot \tau\right) \cdot h \cdot h^* +$$
$$h \cdot s(n-\tau) \cdot \exp\left(j \cdot 2\pi \cdot \frac{\Delta f}{f_s} \cdot n\right) \cdot \eta^*(n-\tau) +$$
$$h^* \cdot s^*(n) \cdot \exp\left(-j \cdot 2\pi \cdot \frac{\Delta f}{f_s} \cdot (n-\tau)\right) \cdot \eta(n) +$$
$$s^*(n) \cdot s(n-\tau) \cdot \eta(n) \cdot \eta^*(n-\tau)$$
$$= \exp\left(j \cdot 2\pi \cdot \frac{\Delta f}{f_s} \cdot n\right) \cdot \{|h|^2 + h \cdot \alpha(n-\tau) + h^* \cdot \alpha^*(n)\} +$$
$$s^*(n) \cdot s(n-\tau) \cdot \eta(n) \cdot \eta^*(n-\tau)$$

In Formula 2, $\alpha(n)$ is expressed by Formula 3.

[Formula 3]

$$\alpha(n) = s(n) \cdot \exp\left(j \cdot 2\pi \cdot \frac{\Delta f}{f_s} \cdot n\right) \cdot \eta^*(n) \quad (3)$$

When the averaging unit 64 averages physical amounts $z(n)$ of N samples, an averaged physical amount $\phi$ is expressed by Formula 4 if the sample number N is greater than a value of the time difference $\tau$ sample (phase difference $N > \tau$).

[Formula 4]

$$\Phi = \sum_{n=1}^{N} z(n) \quad (4)$$
$$= \exp\left(j \cdot 2\pi \cdot \frac{\Delta f}{f_s} \cdot \tau\right) \cdot \left\{ N \cdot |h|^2 + \sum_{n=1-\tau}^{0} h \cdot \alpha(n) + 2 \cdot \sum_{n=0}^{N-\tau} \text{Re}[h \cdot \alpha(n)] + \sum_{n=N-\tau+1}^{N} h^* \cdot \alpha^*(n) \right\} +$$
$$\sum_{n=1}^{N} s^*(n) \cdot s(n-\tau) \cdot \eta(n) \cdot \eta^*(n-\tau)$$

In Formula 4, symbol Re[•] denotes a real number.

When the sample number N is equal to or smaller than the value of the time difference $\tau$ sample (phase difference $N \le \tau$), the averaged physical amount $\phi$ is expressed by Formula 5.

[Formula 5]

$$\Phi = \sum_{n=1}^{N} z(n) \quad (5)$$
$$= \exp\left(j \cdot 2\pi \cdot \frac{\Delta f}{f_s} \cdot \tau\right) \cdot \left\{ N \cdot |h|^2 + \sum_{n=1-\tau}^{N-\tau} h \cdot \alpha(n) + \sum_{n=1}^{N} h^* \cdot \alpha^*(n) \right\} +$$
$$\sum_{n=0}^{N} s^*(n) \cdot s(n-\tau) \cdot \eta(n) \cdot \eta^*(n-\tau)$$

When the phase difference detection unit 63 uses the delay detection, the frequency estimation unit 65 calculates an estimate $f_{est}$ of the carrier frequency offset, based on Formula 6.

[Formula 6]

$$f_{est} = \frac{f_s}{2\pi \cdot \tau} \cdot \tan^{-1}\left(\frac{\text{Im}[\Phi]}{\text{Re}[\Phi]}\right) \quad (6)$$

In Formula 6, symbol Im[•] denotes an imaginary number.

When the effects of the noise $\eta(n)$ in the averaged physical amount $\phi$ are negligibly smaller, components other than a first term included in brackets { } in Formula 4 or 5 are 0 (zero), that is, Formula 4 or 5 includes only a real number component. Accordingly, the estimate $f_{est}$ of the carrier frequency offset can be calculated without an error.

However, effects of the noise $\eta(n)$ cannot be neglected in a general radio communication system. Error estimation when the effects of the noise $\eta(n)$ cannot be neglected will now be described using formulas.

The noise $\eta(n)$ is independent for each sample and stochastically dependent on a complex Gaussian distribution. Accordingly, when two independent variables dependent on the Gaussian distribution are subjected to a linear operation, an averaged physical amount $\Phi$ of $N > \tau$ in Formula 4 may be expressed as Formula 7 by the nature of the Gaussian distribution. The nature of the Gaussian distribution includes a nature of approximation to a Gaussian distribution with a variance obtained through a linear operation of variances of two variables.

When two independent variables dependent on the Gaussian distribution are multiplied, a distribution that is not strictly a Gaussian distribution, but that is close to a Gaussian distribution is obtained. Accordingly, it is assumed hereinafter that the distribution can be approximated to a Gaussian distribution with a variance obtained by multiplying the variances of the two variables.

[Formula 7]

$$\Phi = \exp\left(j \cdot 2\pi \cdot \frac{\Delta f}{f_s} \cdot \tau\right) \cdot \quad (7)$$
$$\left\{ N \cdot |h|^2 + \sqrt{(2N-\tau) \cdot |h|^2 + \frac{N}{2}} \cdot \eta_r + j \cdot \sqrt{\tau \cdot |h|^2 + \frac{N}{2}} \cdot \eta_i \right\}$$

The averaged physical amount $\phi$ when $N \le \tau$ in Formula 5 may be expressed as Formula 8.

[Formula 8]

$$\Phi = \exp\left(j \cdot 2\pi \cdot \frac{\Delta f}{f_s} \cdot \tau\right) \cdot \quad (8)$$
$$\left\{ N \cdot |h|^2 + \sqrt{N \cdot |h|^2 + \frac{N}{2}} \cdot \eta_r + j \cdot \sqrt{N \cdot |h|^2 + \frac{N}{2}} \cdot \eta_i \right\}$$

In Formulas 7 and 8, the noises $\eta_r$ and $\eta_i$ are variables dependent on the Gaussian distribution in which the variance is 1.

Here, the case where a total power of reception signals used for estimation of the carrier frequency offset is sufficiently higher than noise power, that is, the case expressed by Formula 9 will be described.

[Formula 9]

$$N \cdot |h|^2 \gg 1 \quad (9)$$

When the total power is expressed by Formula 9, the estimate $f_{est}$ of the carrier frequency offset calculated by the frequency estimation unit 65 uses a relationship of tan θ is nearly equal to θ when θ takes a sufficiently smaller value than 1 (θ<<1). When N>τ, the estimate $f_{est}$ of the carrier frequency offset is approximated by Formula 10.

[Formula 10]

$$f_{est} \approx \Delta f + \frac{f_s}{2\pi \cdot \sqrt{\tau \cdot N \cdot |h|^2}} \sqrt{\frac{1}{N} + \frac{1}{2\tau \cdot |h|^2}} \cdot \eta_\theta \quad (10)$$

When N≤τ, the estimate $f_{est}$ of the carrier frequency offset is approximated to Formula 11.

[Formula 11]

$$f_{est} \approx \Delta f + \frac{f_s}{2\pi \cdot \tau \cdot |h| \cdot \sqrt{N}} \sqrt{1 + \frac{1}{2|h|^2}} \cdot \eta_\theta \quad (11)$$

In Formulas 10 and 11, the noise $\eta_\theta$ is a variable dependent on the Gaussian distribution in which the variance is 1.

An acquisition range in which the carrier frequency offset can be estimated is defined, for example, by Formula 12.

[Formula 12]

$$-\frac{f_s}{2\tau} < f_{est} < \frac{f_s}{2\tau} \quad (12)$$

As shown in Formula 10 or 11, a conventional carrier frequency offset estimation system can reduce an estimation error of the carrier frequency offset as a sampling rate is lower, a time of the time difference τ sample is longer, a reception level $|h|^2$ is higher, and an averaging sample number N is greater. Among them, a range in which the sampling rate $f_s$ and the time difference τ sample can be set are limited by the acquisition range of the carrier frequency offset shown in Formula 12.

Accordingly, the conventional frequency offset estimation system determines a sampling rate $f_s$ and the value of a time difference τ sample from the acquisition range of required carrier frequency offsets. The system then determines the sample number N from an allowed estimation error and an assumed reception level $|h|^2$.

However, in a multi-path environment such as non-line-of-sight propagation, a plurality of paths are added in a reverse phase and the reception level is greatly degraded with a certain probability. For example, in a Rayleigh fading environment, the probability that an instantaneous reception level will be at least 20 dB lower than an average reception level is about 1%. This Rayleigh fading environment is a general model of a multi-path environment.

Accordingly, when a conventional carrier frequency offset estimation system is used in a multi-path fading environment, it is necessary to set an averaging sample number to a value sufficiently greater than the number defined as a carrier-to-noise ratio (CNR) and to sufficiently increase an average reception level in order to prevent an estimation error from increasing due to reception level degradation. This causes degradation of frame use efficiency, an increase of a carrier frequency offset estimation time, and an increase of consumption power and cost of a transmission device due to increased transmission power, as a long training signal is assigned.

[Non-patent Document 1] Masahiro Morikura, Shuji Kubota, et al., "Revised version 802.11 High-speed Wireless LAN Textbook", Impress, pp. 204-205, 2005

DISCLOSURE OF THE INVENTION

Problems to be Solved by the Invention

The present invention has been achieved in view of the above circumstances, and it is an object of the present invention to provide a radio communication system, a transmission device, a reception device, a radio communication method, a transmission method, and a reception method that accurately estimate a carrier frequency offset with a small averaging sample number even in a multi-path environment.

Means for Solving the Problems (1) A radio communication system according to an aspect of the present invention is a radio communication system including a transmission device which transmits a plurality of radio signals, and a reception device which receives the plurality of radio signals from the transmission device and estimates, as a carrier frequency offset, a difference between a carrier frequency transmitted by the transmission device and a reference reception frequency used for reception, the radio communication system including: the transmission device which branches a first previously determined sequence of training signals, and transmits the radio signals modulated with frequencies of the carrier frequency offsets having regularity for a first sequence of a plurality of branched training signals; and the reception device which estimates the carrier frequency offset with the transmission device according to the first sequence of training signals included in the radio signals transmitted from the transmission device and phase shift amounts obtained from the first previously determined sequence of training signals.

Thus, phase difference detection for the training signals is facilitated by a function of the frequency offsets assigned to the first sequence of training signals transmitted by the plurality of radio signals. Accordingly, the carrier frequency offset can be accurately estimated with a shorter training signal length or a lower transmission power.

(2) A radio communication system according to an aspect of the present invention is a radio communication system including a transmission device which transmits a plurality of radio signals from a plurality of transmitting antennas, and a reception device which receives the plurality of radio signals from the transmission device using a receiving antenna and estimates, as a carrier frequency offset, a difference between a carrier frequency transmitted by the transmission device and a reference reception frequency used for reception, wherein the transmission device includes: a first training signal sequence generation unit which generates a first previously determined sequence of training signals; a first frequency offset assignment unit which assigns frequency offsets to respective frequencies assigned to the first sequence of training signals branched in the same number as the number of the plurality of transmitting antennas, the frequency offsets being integer times a frequency $f_1$; and a transmission unit which transmits the radio signals including the first sequence of training signals having the frequency offsets assigned by the first frequency offset assignment unit to the reception device via the transmitting antennas, and wherein the reception device includes: a receiving unit which receives the radio signals from the transmission device via the receiving antenna; a first phase difference detection unit which detects first physical amounts dependent on phase shift amounts in a time difference $T_1$ that is natural number times a time represented by the reciprocal of the frequency $f_1$ based on the first sequence of training signals included in the radio signals transmitted from the transmission device and a first previously determined sequence of training signals; a first averaging unit which calculates a first averaged physical amount by averaging the first physical amounts; and a frequency estimation unit which estimates the carrier frequency offset based on the first averaged physical amount.

Thus, normal drop of the reception level can be avoided by a function of the frequency offsets assigned to a given sequence of training signals transmitted by the plurality of radio signals from the plurality of transmitting antennas. Accordingly, effects of noise can be reduced in the phase difference detection, such that the carrier frequency offset can be accurately estimated with a shorter training signal length or a lower transmission power even in a multi-path fading environment.

(3) In the radio communication system according to an aspect of the present invention, the transmission device may further include: a second training signal sequence generation unit which generates a second previously determined sequence of training signals; and a second frequency offset assignment unit which assigns frequency offsets of which absolute values are smaller than half the reciprocal of a time difference $T_1$, to respective frequencies assigned to the second sequence of training signals branched in the same number as the number of the plurality of transmitting antennas, wherein the transmission unit may multiplex the first sequence of training signals having the frequency offsets assigned by the first frequency offset assignment unit and the second sequence of training signals having the frequency offsets assigned by the second frequency offset assignment unit, and transmit the resultant signals as the radio signals to the reception device via the transmitting antennas, wherein the reception device may further include: a second phase difference detection unit which detects second physical amounts dependent on phase shift amounts in a time difference $T_2$ that is shorter than the time difference $T_1$ based on the second sequence of training signals included in the radio signals transmitted from the transmission device and a second previously determined sequence of training signals; and a second averaging unit which calculates a second averaged physical amount by averaging the second physical amounts, and wherein the frequency estimation unit may estimate the carrier frequency offset based on the first averaged physical amount and the second averaged physical amount.

Thus, a wide acquisition range and a short acquisition time can be realized by performing the phase difference detection using the second sequence of training signals. The estimation accuracy is within an acquisition range of the phase difference detection using the first sequence of training signals. Accordingly, high estimation accuracy can also be provided through a combination with subsequent phase difference detection using the first sequence of training signals.

(4) In the radio communication system according to an aspect of the present invention, the second frequency offset assignment unit may assign the frequency offsets so that an absolute value of a difference between all the assigned frequency offsets is an integer times the frequency $f_2$, and wherein the second averaging unit may average the second physical amounts in a range of times that are natural number times the reciprocal of the frequency $f_2$.

Thus, as the second phase difference detection unit uses the delay-detection-type phase difference detection, the carrier frequency offset can be estimated with high accuracy.

(5) A transmission device according to an aspect of the present invention is a transmission device which transmits a plurality of radio signals from a plurality of transmitting antennas, the transmission device including: a first training signal sequence generation unit which generates a first previously determined sequence of training signals; a first frequency offset assignment unit which assigns frequency offsets to respective frequencies assigned to the first sequence of training signals branched in the same number as the number of the plurality of transmitting antennas, the frequency offsets being integer times a frequency $f_1$; and a transmission unit which transmits the radio signals including the first sequence of training signals having the frequency offsets assigned by the first frequency offset assignment unit to the reception device via the transmitting antennas.

(6) In the transmission device according to an aspect of the present invention, the transmission device may further include: a second training signal sequence generation unit generates a second previously determined sequence of training signals; and a second frequency offset assignment unit which assigns frequency offsets of which absolute values are smaller than half of the reciprocal of a time difference $T_1$, to frequencies assigned to the second sequence of training signals branched in the same number as the number of the plurality of transmitting antennas, and wherein the transmission unit may multiplex the first sequence of training signals having the frequency offsets assigned by the first frequency offset assignment unit and the second sequence of training signals having the frequency offsets assigned by the second frequency offset assignment unit, and transmit the resultant signals as the radio signals to the reception device via the transmitting antennas.

(7) In the transmission device according to an aspect of the present invention, the second frequency offset assignment unit may assign the frequency offsets so that an absolute value of a difference between all the assigned frequency offsets is an integer times a frequency $f_2$.

(8) A reception device according to an aspect of the present invention is a reception device that communicates with a transmission device which assigns frequency offsets that are integer times a frequency $f_1$ to respective frequencies assigned to a first sequence of branched training signals to transmit a plurality of radio signals from a plurality of transmitting antennas, receives the plurality of radio signals from the transmission device using a receiving antenna, and estimates, as a carrier frequency offset, a difference between a carrier frequency transmitted by the transmission device and a reference reception frequency used for reception, the reception device including: a receiving unit which receives the radio signals from the transmission device via the receiving antenna; a first phase difference detection unit which detects first physical amounts dependent on phase shift amounts in a time difference $T_1$ that is a natural number times a time represented by the reciprocal of the frequency $f_1$ based on the first sequence of training signals included in the radio signals transmitted from the transmission device and a first previously determined sequence of training signals; a first averaging unit which calculates a first averaged physical amount by averaging the first physical amounts; and a frequency estimation unit which estimates a carrier frequency offset based on the first averaged physical amount.

(9) In the reception device according to an aspect of the present invention, the reception device may communicate with a transmission device which multiplexes and transmits a second sequence of training signals having frequency offsets of which absolute values are smaller than half of the reciprocal of a time difference $T_1$, for respective frequencies assigned to a second sequence of branched training signals, and the first sequence of training signals, the reception device may further include: a second phase difference detection unit which detects second physical amounts dependent on phase shift amounts in a time difference $T_2$ that is shorter than the time difference $T_1$ based on the second sequence of training signals included in the radio signals transmitted from the transmission device and a second previously determined sequence of training signals; and a second averaging unit calculates a second averaged physical amount by averaging the second physical amounts, wherein the frequency estimation unit may estimate the carrier frequency offset based on the first averaged physical amount and the second averaged physical amount.

(10) In the reception device according to an aspect of the present invention, the reception device may communicate with a transmission device which assigns the frequency offset so that an absolute value of a difference between all the assigned frequency offsets is an integer times the frequency $f_2$, and wherein the second averaging unit may average the second physical amounts in a range of times that are natural number times the reciprocal of the frequency $f_2$.

(11) In the reception device according to an aspect of the present invention, the first phase difference detection unit may calculate the first physical amounts by subtracting a phase shift amount in the time difference of the first previously determined sequence of training signals from a phase shift amount in a time difference $T_1$ of the first sequence of training signals included in the radio signals transmitted from the transmission device.

Thus, a phase detection operation can be performed only by addition and subtraction, thereby simplifying a circuit configuration.

(12) In the reception device according to an aspect of the present invention, the first phase difference detection unit may calculate the first physical amounts by multiplying a conjugate complex of a delay detection result in the time difference $T_1$ of the first sequence of training signals included in the radio signals transmitted from the transmission device by a conjugate complex of a delay detection result in the time difference of the first previously determined sequence of training signals.

Thus, the first phase difference detection unit uses delay-detection-type phase difference detection, thereby estimating the carrier frequency offset with high accuracy.

(13) In the reception device according to an aspect of the present invention, wherein the first averaging unit may calculate the first averaged physical amount by averaging the first physical amounts in a range of times that are a natural number times a time represented by the reciprocal of the frequency $f_1$.

Thus, the first averaging unit averages the physical amounts $z_1(n)$ of $N_1$ samples that are natural number times $f_s/f_1$ samples. Thus, a carrier frequency offset estimation accuracy corresponding to the averaging sample number $N_1$ can be obtained.

(14) In the reception device according to an aspect of the present invention, the second phase difference detection unit may calculate the second physical amounts by subtracting a phase shift amount in the time difference of the second previously determined sequence of training signals from a phase shift amount in a time difference $T_2$ of the second sequence of training signals included in the radio signals transmitted from the transmission device.

Thus, a phase detection operation can be performed only by addition and subtraction, thereby simplifying a circuit configuration.

(15) In the reception device according to an aspect of the present invention, the second phase difference detection unit may calculate the second physical amounts by multiplying from a delay detection result in a time difference $T_2$ of the second sequence of training signals included in the radio signals transmitted from the transmission device by a conjugate complex of a delay detection result in the time difference of the second previously determined sequence of training signals.

Thus, the frequency offsets are assigned so that the absolute value of a difference between all frequency offsets assigned by the second frequency offset assignment unit is an integer times the frequency $f_2$. Also, the second averaging unit averages the second physical amounts of $N_2$ samples corresponding to natural number times the $f_s/f_2$ samples. Accordingly, carrier frequency offset estimation accuracy corresponding to the averaging sample number $N_2$ can be obtained.

(16) In the reception device according to an aspect of the present invention, the receiving device may include a plurality of at least one of the receiving unit, the first phase difference detection unit, the first averaging unit, and the frequency estimation unit, and wherein the reception device may include a signal selection and combining unit which selects or combines a plurality of signals output by the at least one of the receiving unit, the first phase difference detection unit, the first averaging unit, and the frequency estimation unit, and outputting the resultant signals.

(17) A radio communication method according to an aspect of the present invention is a radio communication method using a transmission device which transmits a plurality of radio signals, and a reception device which receives the plurality of radio signals from the transmission device and estimates, as a carrier frequency offset, a difference between a carrier frequency transmitted by the transmission device and a reference reception frequency used for reception, wherein the transmission device branches a first previously determined sequence of training signals, and transmits the radio signals modulated with frequencies by the carrier frequency offsets having regularity for a first sequence of a plurality of branched training signals, and wherein the reception device estimates the carrier frequency offset with the transmission device according to the first sequence of training signals included in the radio signals transmitted from the transmission device and phase shift amounts obtained from the first previously determined sequence of training signals.

(18) A radio communication method according to an aspect of the present invention is a radio communication method using a transmission device which transmits a plurality of radio signals from a plurality of transmitting antennas, and a reception device for receiving the plurality of radio signals from the transmission device using a receiving antenna and estimates, as a carrier frequency offset, a difference between a carrier frequency transmitted by the transmission device and a reference reception frequency used for reception, wherein the transmission device carries out: a first training signal sequence generation process which generates a first previously determined sequence of training signals; a first frequency offset assignment process which assigns frequency offsets to respective frequencies assigned to the first sequence of training signals branched in the same number as the number of the plurality of transmitting antennas, the frequency offsets being integer times a frequency $f_1$; and a transmission process which transmits the radio signals including the first sequence of training signals having the frequency offsets assigned in the first frequency offset assignment process to the reception device via the transmitting antennas, and wherein the reception device carries out: a receiving process which receives the radio signals from the transmission device via the receiving antenna; a first phase difference detection process which detects first physical amounts dependent on phase shift amounts in a time difference $T_1$ that is natural number times a time represented by the reciprocal of the frequency $f_1$ based on the first sequence of training signals included in the radio signals transmitted from the transmission device and a first previously determined sequence of training signals; a first averaging process which calculates a first averaged physical amount by averaging the first physical amounts; and a frequency estimation process which estimates the carrier frequency offset based on the first averaged physical amount.

(19) In a radio communication method according to an aspect of the present invention, the transmission device may further carries out: a second training signal sequence generation process which generates a second previously determined sequence of training signals; and a second frequency offset assignment process which assigns frequency offsets of which absolute values are smaller than half the reciprocal of a time difference $T_1$, to respective frequencies assigned to the second sequence of training signals branched in the same number as the number of the plurality of transmitting antennas, the transmission process may include multiplexing the first sequence of training signals having the frequency offsets assigned in the first frequency offset assignment process and the second sequence of training signals having the frequency offsets assigned in the second frequency offset assignment process, and transmitting the resultant signals as the radio signals to the reception device via the transmitting antennas, and wherein the reception device may further carries out: a second phase difference detection process which detects second physical amounts dependent on phase shift amounts in a time difference $T_2$ that is shorter than the time difference $T_1$ based on the second sequence of training signals included in the radio signals transmitted from the transmission device and a second previously determined sequence of training signals; and a second averaging process which calculates a second averaged physical amount by averaging the second physical amounts, the frequency estimation process including estimating the carrier frequency offset based on the first averaged physical amount and the second averaged physical amount.

(20) In a radio communication method according to an aspect of the present invention, the second frequency offset assignment process may include assigning the frequency offsets so that an absolute value of a difference between all the assigned frequency offsets is an integer times the frequency $f_2$, and wherein the second averaging process includes averaging the second physical amounts in a range of times that are natural number times the reciprocal of the frequency $f_2$.

(21) A transmission method according to an aspect of the present invention is a transmitting method using a transmission device which transmits a plurality of radio signals from a plurality of transmitting antennas, the transmission method including: a first training signal sequence generation process which generates a first previously determined sequence of training signals; a first frequency offset assignment process which assigns frequency offsets to respective frequencies assigned to the first sequence of training signals branched in the same number as the number of the plurality of transmitting antennas, the frequency offsets being integer times a frequency $f_1$; and a transmission process which transmits the radio signals including the first sequence of training signals having the frequency offsets assigned in the first frequency offset assignment process to the reception device via the transmitting antennas.

(22) A reception method according to an aspect of the present invention is a receiving method using a reception device that communicates with a transmission device which assigns frequency offsets that are integer times a frequency $f_1$ to respective frequencies assigned to a first sequence of branched training signals to transmit a plurality of radio signals from a plurality of transmitting antennas, receives the plurality of radio signals from the transmission device using a receiving antenna, and estimates, as a carrier frequency offset, a difference between a carrier frequency transmitted by the transmission device and a reference reception frequency used for reception, the receiving method including: a reception process which receives the radio signals from the transmission device via the receiving antenna; a first phase difference detection process which detects first physical amounts dependent on phase shift amounts in a time difference $T_1$ that is a natural number times a time represented by the reciprocal of the frequency $f_1$ based on the first sequence of training signals included in the radio signals transmitted from the transmission device and a first previously determined sequence of training signals; a first averaging process which calculates a first averaged physical amount by averaging the first physical amounts; and a frequency estimation process which estimates a carrier frequency offset based on the first averaged physical amount.

Effects of the Invention

The radio communication system, the transmission device, the reception device, the radio communication method, the transmission method, and the reception method of the present invention are capable of accurately estimating the carrier frequency offset with a small averaging sample number even in a multi-path environment.

EMBODIMENTS FOR CARRYING OUT THE INVENTION (First Embodiment)

Hereinafter, a first embodiment of the present invention will be described with reference to the accompanying drawings.

Figure 1:
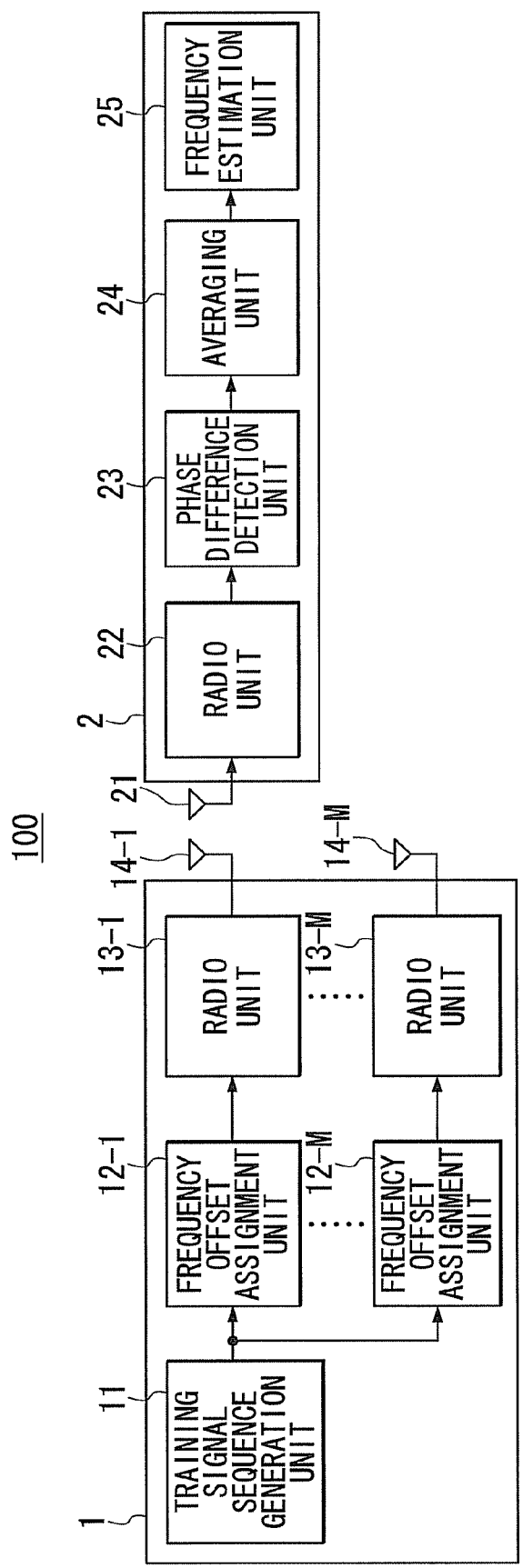
FIG. 1 is a block diagram showing a radio communication system 100 according to a first embodiment of the present invention.

FIG. 1 is a schematic block diagram showing a radio communication system 100 according to the present embodiment. A radio communication system 100 for estimating a carrier frequency offset using a previously determined sequence of training signals will be described with reference to FIG. 1.

The radio communication system 100 shown in FIG. 1 includes a transmission device 1 and a reception device 2. The transmission device 1 includes a training signal sequence generation unit 11, frequency offset assignment units 12-1 to 12-M, radio units 13-1 to 13-M, and transmitting antennas 14-1 to 14-M. Symbol M denotes an integer equal to or greater than 2.

The training signal sequence generation unit 11 generates a previously determined sequence of training signals, and outputs the training signals to the frequency offset assignment units 12-1 to 12-M.

The frequency offset assignment units 12-1 to 12-M assign frequency offsets that are integer times a frequency $f_1$ to the training signals generated by the training signal sequence generation unit 11, and output the resultant training signals to the radio units 13-1 to 13-M.

The radio units 13-1 to 13-M perform analog conversion and frequency conversion on the training signals, which are generated by the training signal sequence generation unit 11 and assigned the frequency offsets by the frequency offset assignment units 12-1 to 12-M, and output the training signals as radio signals to the transmitting antennas 14-1 to 14-M.

The transmitting antennas 14-1 to 14-M transmit the radio signals output from the radio units 13-1 to 13-M connected to the transmitting antennas 14-1 to 14-M, to the reception device 2.

Hereinafter, a connection of the components of the transmission device 1 and a signal flow will be described.

The training signal sequence generation unit 11 has an output terminal connected to respective input terminals of the frequency offset assignment units 12-1 to 12-M. The training signal sequence generation unit 11 branches the generated training signal and outputs the training signals to the frequency offset assignment units 12-1 to 12-M.

The frequency offset assignment units 12-1 to 12-M have the input terminals connected to the output terminal of the training signal sequence generation unit 11, and output terminals connected to input terminals of the radio units 13-1 to 13-M in a one-to-one correspondence. The frequency offset assignment units 12-1 to 12-M assign the frequency offsets to the input training signals and output the resultant training signals to the radio units 13-1 to 13-M.

The radio units 13-1 to 13-M have the input terminals connected to the output terminals of the frequency offset assignment units 12-1 to 12-M in a one-to-one correspondence, and output terminals connected to input terminals of the transmitting antennas 14-1 to 14-M in a one-to-one correspondence. The radio units 13-1 to 13-M perform conversion on the input signals, i.e., the training signals assigned the frequency offsets, to generate radio signals, and transmit the radio signals to the reception device 2 via the transmitting antennas 14-1 to 14-M.

The reception device 2 includes a receiving antenna 21, a radio unit 22, a phase difference detection unit 23, an averaging unit 24, and a frequency estimation unit 25.

The receiving antenna 21 receives the radio signals transmitted from the transmission device 1, and outputs the radio signals to the radio unit 22.

The radio unit 22 performs frequency conversion and digital conversion on the radio signals received by the receiving antenna 21 to generate reception signals, and outputs the reception signals to the phase difference detection unit 23.

The phase difference detection unit 23 compares the reception signal generated by the radio unit 22 with a previously determined sequence of training signals. The phase difference detection unit 23 detects physical amounts represented by a function of phase shift amounts in a time difference $T_1$ that is a natural number times a time represented by the reciprocal of a frequency $f_1$, and outputs the physical amounts to the averaging unit 24.

The averaging unit 24 averages the physical amounts output from the phase difference detection unit 23 in order to avoid effects of noise, and outputs an averaged physical amount to the frequency estimation unit 25.

The frequency estimation unit 25 estimates the carrier frequency offset based on the averaged physical amount from the averaging unit 24.

A connection of the components of the reception device 2 and a signal flow will now be described.

The receiving antenna 21 is an output terminal connected to an input terminal of the radio unit 22. The receiving antenna 21 outputs the received radio signal to the radio unit 22.

The radio unit 22 has the input terminal connected to the output terminal of the receiving antenna 21, and an output terminal connected to an input terminal of the phase difference detection unit 23. The radio unit 22 outputs the reception signal generated from the radio signal received by the receiving antenna 21, to the phase difference detection unit 23.

The phase difference detection unit 23 has the input terminal connected to the output terminal of the radio unit 22, and an output terminal connected to the averaging unit 24. The phase difference detection unit 23 extracts a training signal portion included in the reception signal input from the radio unit 22, and outputs the physical amounts represented by a function of the phase shift amounts obtained by comparing the training signals with a previously determined sequence of training signals, to the averaging unit 24.

The averaging unit 24 has an input terminal connected to the output terminal of the phase difference detection unit 23 and an output terminal connected to the frequency estimation unit 25. The averaging unit 24 outputs an averaged physical amount obtained through an averaging process performed on the physical amounts input from the phase difference detection unit 23, to the frequency estimation unit 25.

The frequency estimation unit 25 has an input terminal connected to the output terminal of the averaging unit 24. The frequency estimation unit 25 estimates the carrier frequency offset based on the input averaged physical amount and outputs the result.

Next, an operational principle of a carrier frequency offset estimation system in the first embodiment of the present invention will be described using formulas. Hereinafter, for simplification of explanation, a description will be given of a sample unit.

Here, n is a sample number. $s_1(n)$ is a training signal generated by the training signal sequence generation unit 11. The first training signal $x_{1m}(n)$ assigned the frequency offset by the frequency offset assignment unit 12-$m$ may be expressed by Formula 13 when the frequency offset is assigned at regular intervals. Symbol m denotes a natural number from 1 to M.

[Formula 13]

$$x_{1m}(n) = s_1(n) \cdot \exp\left(j \cdot 2\pi \cdot \frac{m \cdot f_1}{f_s} \cdot n\right) \tag{13}$$

In Formula 13, $f_s$ is a sampling frequency. A frequency $f_1$ when the frequency offset is assigned at regular intervals needs to satisfy a relationship of Formula 14 in order to prevent a phase variation due to the frequency offset assignment from being the same among samples.

[Formula 14]

$$f_s \geq M \cdot f_1 \tag{14}$$

In this case, the reception signal $y_1(n)$ generated through the reception in the receiving antenna 21 and the frequency conversion and digital conversion in the radio unit 22 may be expressed by Formula 15.

[Formula 15]

$$y_1(n) = \exp\left(j \cdot 2\pi \cdot \frac{\Delta f}{f_s} \cdot n\right) \cdot \sum_{n=1-\tau}^{0} h_m \cdot x_{1m}(n) + \eta_1(n) \tag{15}$$
$$= s_1(n) \cdot \exp\left(j \cdot 2\pi \cdot \frac{\Delta f}{f_s} \cdot n\right) \cdot \beta_1(n) + \eta_1(n)$$

In Formula 15, $h_m$ is a complex amplitude response between the transmitting antenna 14-$m$ (symbol m denotes a natural number from 1 to M) and the receiving antenna 21. $\Delta f$ is a carrier frequency offset between the transmission device 1 and the reception device 2. $f_s$ is a sampling frequency. Symbol $\eta_1(n)$ denotes a noise independent for each sample and dependent on a complex Gaussian distribution in which an average power amount is 1.

Here, when the training signal sequence s(n) is $s_1(n)$, Formula 15 is obtained by replacing the phase amplitude response h in Formula 1 with a time-varying variable $\beta_1(n)$. $\beta_1(n)$ may be considered a variable corresponding to the phase amplitude response and may be expressed by Formula 16.

[Formula 16]

$$\beta_1(n) = \sum_{m=1}^{M} h_m \cdot \exp\left(j \cdot 2\pi \cdot \frac{m \cdot f_1}{f_s} \cdot n\right) \tag{16}$$

The phase difference detection unit 23, the averaging unit 24, and the frequency estimation unit 25 estimate the carrier frequency offset $\Delta f$ using the information of the generated reception signal $y_1(n)$ and the previously determined training signal $s_1(n)$ generated by the training signal sequence generation unit 11.

When the phase difference detection unit 23 uses delay-detection-type phase difference detection, a physical amount $z_1(n)$ that is a function of phase shift amounts in a time difference $\tau_1$ sample may be expressed by Formula 17.

[Formula 17]

$$z_1(n) = s_1^*(n) \cdot s_1(n-\tau_1) \cdot y_1(n) \cdot y_1^*(n-\tau_1) \tag{17}$$
$$= \exp\left(j \cdot 2\pi \cdot \frac{\Delta f}{f_s} \cdot \tau_1\right) \cdot \beta_1(n) \cdot \beta_1^*(n-\tau_1) + s_1(n-\tau_1) \cdot$$
$$\exp\left(j \cdot 2\pi \cdot \frac{\Delta f}{f_s} \cdot n\right) \cdot \beta_1(n) \cdot \eta_1^*(n-\tau_1) + s_1^*(n) \cdot$$
$$\exp\left(-j \cdot 2\pi \cdot \frac{\Delta f}{f_s} \cdot (n-\tau_1)\right) \cdot \beta_1^*(n-\tau_1) \cdot \eta_1(n) +$$
$$s_1^*(n) \cdot s_1(n-\tau_1) \cdot \eta_1(n) \cdot \eta_1^*(n-\tau_1)$$
$$= \exp\left(j \cdot 2\pi \cdot \frac{\Delta f}{f_s} \cdot \tau_1\right)\{|\beta_1(n)|^2 + \beta_1(n-\tau_1) \cdot$$
$$\alpha(n-\tau_1) + \beta_1^*(n) \cdot \alpha_1^*(n)\} + s_1^*(n) \cdot s_1(n-\tau_1) \cdot$$
$$\eta_1(n) \cdot \eta_1^*(n-\tau_1)$$

In Formula 17, $\alpha_1(n)$ is shown by Formula 18.

[Formula 18]

$$\alpha_1(n) = s_1(n) \cdot \exp\left(j \cdot 2\pi \cdot \frac{\Delta f}{f_s} \cdot n\right) \cdot \eta_1^*(n) \tag{18}$$

Here, $\tau_1 = f_s T_1$. When k is any natural number, the time difference $\tau_1$ sample is set to satisfy a relationship of Formula 19.

[Formula 19]

$$\tau_1 = f_s \cdot T_1 = k \cdot \frac{f_s}{f_1} \tag{19}$$

When the averaging unit 24 averages the physical amounts $z_1(n)$ of $N_1$ samples that are natural number times $f_s/f_1$ samples corresponding to one period of a variable $\beta_1(n)$, the averaged physical amount $\phi_1$ may be expressed by Formula 20 if the sample number N is greater than the value of the time difference $\tau_1$ sample ($N > \tau_1$).

[Formula 20]

$$\Phi_1 = \sum_{n=1}^{N_1} z_1(n) \qquad (20)$$

$$= \exp\left(j \cdot 2\pi \cdot \frac{\Delta f}{f_s} \cdot \tau_1\right) \cdot \left\{ \sum_{n=1}^{N_1} |\beta_1(n)|^2 + \sum_{n=1-\tau_1}^{0} \beta_1(n) \cdot \alpha_1(n) + 2 \cdot \sum_{n=0}^{N_1-\tau_1} \text{Re}[\beta_1(n) \cdot \alpha_1(n)] + \sum_{n=N_1-\tau_1+1}^{N_1} \beta_1^*(n) \cdot \alpha_1^*(n) \right\} +$$

$$\sum_{n=0}^{N_1} s_1^*(n) \cdot s_1(n - \tau_1) \cdot \eta_1(n) \cdot \eta_1^*(n - \tau_1)$$

When the sample number N is equal to or smaller than the time difference $\tau_1$ sample value ($N \leq \tau_1$), the averaged physical amount $\phi_1$ may be expressed by Formula 21.

[Formula 21]

$$\Phi_1 = \sum_{n=1}^{N_1} z_1(n) \qquad (21)$$

$$= \exp\left(j \cdot 2\pi \cdot \frac{\Delta f}{f_s} \cdot \tau_1\right) \cdot \left\{ \sum_{n=1}^{N_1} |\beta_1(n)|^2 + \sum_{n=1-\tau_1}^{N_1-\tau_1} \beta_1(n) \cdot \alpha_1(n) + \sum_{n=1}^{N_1} \beta_1^*(n) \cdot \alpha_1^*(n) \right\} + \sum_{n=0}^{N_1} s_1^*(n) \cdot s_1(n - \tau_1) \cdot \eta_1(n) \cdot \eta_1^*(n - \tau_1)$$

When the phase difference detection unit 23 uses the delay-detection-type phase difference detection, the frequency estimation unit 25 calculates the estimate $f_{est}$ of the carrier frequency offset. A calculation formula for obtaining the estimate $f_{est}$ of the carrier frequency offset is expressed by Formula 22.

[Formula 22]

$$f_{est} = \frac{f_s}{2\pi \cdot \tau_1} \cdot \tan^{-1}\left(\frac{\text{Im}[\Phi_1]}{\text{Re}[\Phi_1]}\right) \qquad (22)$$

When the noise $\eta_1(n)$ in the averaged physical amount $\phi_1$ is so small that effects of the noise can be neglected, components other than a first term in brackets { } of Formulas 20 and 21 are 0 (zero), that is, Formulas 20 and 21 include only a real number component. Accordingly, the estimate $f_{est}$ of the carrier frequency offset can be calculated without error.

Next, error estimation when the effects of the noise $\eta_1(n)$ cannot be neglected will be described using formulas.

First, a variable $\beta_1(n)$ corresponding to the phase amplitude response is considered. A level of the variable $\beta_1(n)$, that is, a square of the absolute value may be expressed by Formula 23.

[Formula 23]

$$|\beta_1(n)|^2 = \sum_{m=1}^{M} |h_m|^2 + 2 \cdot \sum_{i=1}^{M-1} \text{Re}\left[\exp\left(j \cdot 2\pi \cdot \frac{i}{\tau_1} \cdot n\right) \cdot \sum_{k=i+1}^{M-1} h_{k-i} \cdot h_k^*\right] \qquad (23)$$

A variation period of the variable $\beta_1(n)$ corresponds to $\tau_1$ samples and an average level of the variable is expressed by Formula 24.

[Formula 24]

$$\frac{1}{\tau_1} \sum_{n=1}^{\tau_1} |\beta_1(n)|^2 = \sum_{m=1}^{M} |h_m|^2 \qquad (24)$$

The noise $\eta(n)$ is independent for each sample and stochastically dependent on the complex Gaussian distribution. Accordingly, when the nature of the Gaussian distribution and Formula 22 are used, the averaged physical amount $\phi_1$ when the sample number $N_1$ of Formula 20 is greater than the value of the time difference $\tau_1$ sample ($N_1 > \tau_1$) may be expressed as Formula 25. The nature of the Gaussian distribution includes a nature of approximation to a Gaussian distribution with a variance obtained through a linear operation of the two independent variables when the two independent variables dependent on the Gaussian distribution are subjected to the linear operation.

[Formula 25]

$$\Phi_1 = \exp\left(j \cdot 2\pi \cdot \frac{\Delta f}{f_s} \cdot \tau_1\right) \cdot \qquad (25)$$

$$\left\{ N_1 \cdot \sum_{m=1}^{M} |h_m|^2 + \sqrt{(2N_1 - \tau_1) \cdot \sum_{m=1}^{M} |h_m|^2 + \frac{N_1}{2}} \cdot \eta_r + j \cdot \sqrt{\tau_1 \cdot \sum_{m=1}^{M} |h_m|^2 + \frac{N_1}{2}} \cdot \eta_i \right\}$$

An averaged physical amount $\phi_1$ when the sample number $N_1$ in Formula 21 is equal to or smaller than the value of the time difference $\tau_1$ sample ($N_1 \leq \tau_1$) is represented by Formula 26.

[Formula 26]

$$\Phi_1 = \exp\left(j \cdot 2\pi \cdot \frac{\Delta f}{f_s} \cdot \tau_1\right) \cdot \qquad (26)$$

$$\left\{ N_1 \cdot \sum_{m=1}^{M} |h_m|^2 + \sqrt{N_1 \cdot \sum_{m=1}^{M} |h_m|^2 + \frac{N_1}{2}} \cdot \eta_r + j \cdot \sqrt{N_1 \cdot \sum_{m=1}^{M} |h_m|^2 + \frac{N_1}{2}} \cdot \eta_i \right\}$$

Noises $\eta_r$ and $\eta_i$ are variables dependent on the Gaussian distribution with a variance of 1.

The case where a total power of the reception signals used for estimation of the carrier frequency offset is sufficiently higher than noise power in Formula 26, that is, the case where the total power is expressed by Formula 27, will be described.

[Formula 27]

$$N \cdot \sum_{m=1}^{M} |h_m|^2 \gg 1 \qquad (27)$$

If the total power is expressed by Formula 27, the estimate $f_{est}$ of the carrier frequency offset calculated by the frequency estimation unit 25 may be approximated to Formula 28 when the sample number $N_1$ is greater than the value of the time difference $\tau_1$ sample ($N_1 > \tau_1$). Further, a relationship of $\tan \theta \approx \theta$ when $\theta$ is sufficiently smaller than 1 ($\theta \ll 1$) is used.

[Formula 28]

$$f_{est} \approx \Delta f + \frac{f_s}{2\pi \cdot \sqrt{\tau_1 \cdot N_1 \cdot \sum_{m=1}^{M} |h_m|^2}} \sqrt{\frac{1}{N_1} + \frac{1}{2\tau_1 \cdot \sum_{m=1}^{M} |h_m|^2}} \cdot \eta_\theta \quad (28)$$

When the sample number $N_1$ is equal to or smaller than the value of the time difference $\tau_1$ sample ($N_1 \leq \tau_1$), the estimate may be approximated by Formula 29.

[Formula 29]

$$f_{est} \approx \Delta f + \frac{f_s}{2\pi \cdot \tau_1 \cdot \sqrt{N_1 \cdot \sum_{m=1}^{M} |h_m|^2}} \sqrt{1 + \frac{1}{2 \cdot \sum_{m=1}^{M} |h_m|^2}} \cdot \eta_\theta \quad (29)$$

In Formulas 28 and 29, $\eta_\theta$ is a variable dependent on the Gaussian distribution with a variance of 1.

Further, an acquisition range in which the carrier frequency offset can be estimated may be defined, for example, by Formula 30.

[Formula 30]

$$-\frac{f_s}{2\tau_1} < f_{est} < \frac{f_s}{2\tau_1} \quad (30)$$

When $\tau = \tau_1$ and $N = N_1$ in Formulas 28 and 29, Formulas 28 and 29 are obtained by replacing $|h|^2$ in Formulas 9 and 10 with $\Sigma |h_m|^2$. As described above, in a multi-path fading environment, a reception level drops with a certain probability. However, generally, a probability that reception levels from all transmitting antennas will be low is low. Accordingly, a probability that $\Sigma |h_m|^2$ is equal to or smaller than a certain level, that is, a probability that $|h|^2$ is equal to or smaller than the certain level is low. This is generally called a transmission diversity effect.

Therefore, the method of estimating the carrier frequency offset in the first embodiment of the present invention can reduce the estimation error with the same training signal length and the same transmission power in a multi-path fading environment in comparison with the conventional method of estimating a carrier frequency offset. Also, the estimate with the same estimation error can be obtained with a shorter training signal length or a lower transmission power.

Figure 2:
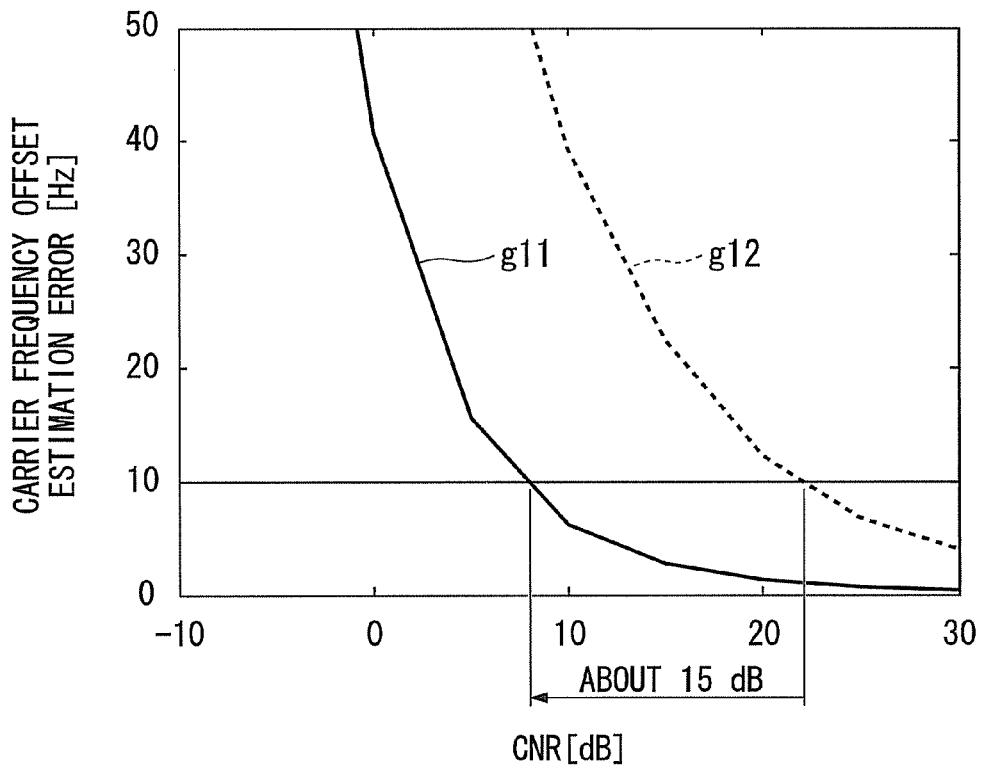
FIG. 2 is a graph showing a comparison of a carrier frequency offset estimation error property between a technique of the first embodiment of the present invention and a conventional technique.
Figure 3:
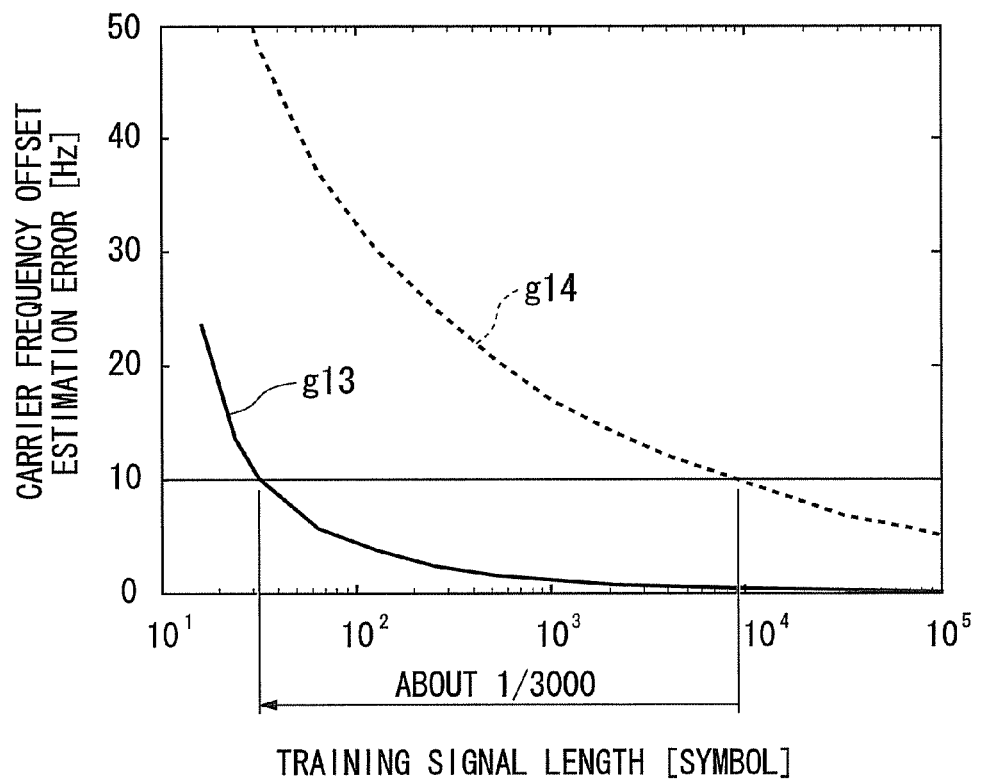
FIG. 3 is a graph showing a comparison of a carrier frequency offset estimation error property between the technique of the first embodiment of the present invention and the conventional technique.

Comparisons of a carrier frequency offset estimation error property between the technique of the first embodiment of the present invention and a conventional technique are shown in FIGS. 2 and 3. Here, since the estimation error exhibits stochastic behavior, root mean square (RMS) was used for evaluation. The modulation rate was 9600 baud and a phase difference detection interval was 8 symbols. Further, in the technique of the first embodiment, a transmitting antenna number was 2. A single-wave Rayleigh fading path independent for each antenna was also assumed as a propagation path In FIG. 2, a horizontal axis indicates CNR [dB]. A vertical axis indicates a carrier frequency offset estimation error [Hz]. In FIG. 2, a curve g11 shows a property when the technique of the first embodiment is used. A curve g12 shows a property when a conventional technique is used.

In FIG. 2, CNR was fixed to 10 dB and a training signal length was changed to evaluate a property of the estimation error. As a result of comparing training signal lengths required to obtain an estimation error of 10 Hz, the conventional technique required about 10000 symbols, whereas the technique of the first embodiment required about 30 symbols. That is, when the carrier frequency offset estimation error is 10 [Hz], the technique of the first embodiment can reduce the training signal length to about 1/300 of the training signal length in the conventional technique.

In FIG. 3, a horizontal axis indicates a training signal length [symbols]. A vertical axis indicates a carrier frequency offset estimation error [Hz]. In FIG. 3, a curve g13 shows a property when the technique of the first embodiment is used. A curve g14 shows a property when a conventional technique is used.

In FIG. 3, a training signal length was fixed to 54 symbols and a CNR was changed to evaluate a property of the estimation error. As a result of comparing CNRs required to obtain the estimation error of 10 [Hz], the conventional technique required about 23 dB, whereas the technique of the first embodiment required about 8 dB. That is, when the carrier frequency offset estimation error is 10 [Hz], the technique of the first embodiment can reduce a transmission power to about 1/30 of the transmission power of the conventional technique.

In the present embodiment, two or more of the plurality of frequency offset assignment units 12-1 to 12-M may assign the same frequency offset. Even in this case, the system in the present embodiment can operate normally. However, when all the frequency offset assignment units 12-1 to 12-M assign the same frequency, only the same effects as conventional effects are obtained. Accordingly, it is preferable that the frequency offset assignment units 12-1 to 12-M assign two or more frequency offsets.

The reception signal $y_1(n)$ is not affected by the noise as the absolute value of the variable $\beta_1(n)$ is greater. Accordingly, the phase difference detection unit 23 can detect the phase difference with higher accuracy as the absolute value of the variable $\beta_1(n)$ is greater. The variable $\beta_1(n)$ varies with the frequency offsets assigned by the frequency offset assignment units 12-1 to 12-M, and a pattern of the variation is not uniquely determined.

Accordingly, if the averaging unit 24 sets an inappropriate averaging sample number $N_1$, only phase differences detected from a reception signal in which the absolute value of the variable $\beta_1(n)$ is small is averaged. Accordingly, the carrier frequency offset estimation accuracy corresponding to the averaging sample number $N_1$ is not obtained in the frequency estimation unit 25.

Here, when the frequency offset assignment units 12-1 to 12-M assign the frequency offsets that are integer times the frequency $f_1$, a variation period of the variable $\beta_1(n)$ necessarily becomes a period of $f_s/f_1$ samples.

Accordingly, the averaging unit 24 averages physical amounts $z_1(n)$ of $N_1$ samples that are natural number times $f_s/f_1$ samples corresponding to one period of the variable $\beta_1(n)$, such that averaging in which a physical amount with high accuracy is necessarily included is performed. The frequency estimation unit 25 can obtain the carrier frequency offset estimation accuracy corresponding to the averaging sample number $N_1$.

As described above, the phase difference can be detected with higher accuracy as the absolute value of the variable $\beta_1(n)$ is greater, and the size of the variable $\beta_1(n)$ is changed. Accordingly, when the detected phase difference itself is subjected to simple averaging, information of a phase difference for which detection accuracy is low may have an effect, and in this case, the estimation accuracy for the carrier frequency offset obtained by the frequency estimation unit 25 is not high.

Here, when the phase difference detection unit 23 uses the delay-detection-type phase difference detection, a phase component of a physical amount $z_1(n)$ indicates the detected phase difference. Further, the size of the physical amount $z_1(n)$ indicates a square of the absolute value, that is, the reliability of the detected phase difference.

Thus, as the phase difference detection unit 23 uses the delay-detection-type phase difference detection, the averaging unit 24 automatically performs appropriate averaging corresponding to the phase difference detection accuracy. Accordingly, the frequency estimation unit 25 can estimate the carrier frequency offset with high accuracy.

While in the present embodiment, the frequency offset assignment units 12-1 to 12-M assign the frequency offsets at regular intervals as described above, the present invention is not limited thereto. The frequency offset assignment units 12-1 to 12-M may assign frequency offsets that are integer times a frequency $f_1$.

While in the present embodiment, the phase difference detection unit 23 uses the delay detection as described above, the present invention is not limited thereto. As the phase difference detection unit 23, any phase difference detection means for detecting physical amounts that is a function of phase shift amounts in the time difference $\tau_1$ sample may be used. For example, a phase difference detection means for detecting a phase difference itself by subtracting a phase shift amount in a time difference of the training signal from a phase shift amount in a time difference $\tau_1$ sample of the reception signal in a portion in which there are training signals may be used.

While in the present embodiment, the averaging unit 24 averages the physical amounts $z_1(n)$ of $N_1$ samples corresponding to a natural number times the delay sample number $\tau_1$ as described above, the present invention is not limited thereto. The averaging sample number $N_1$ may have any value.

Further, a band pass filter may be provided before the phase difference detection unit 23 in order to reduce effects of the noise in the phase difference detection.

Figure 4:
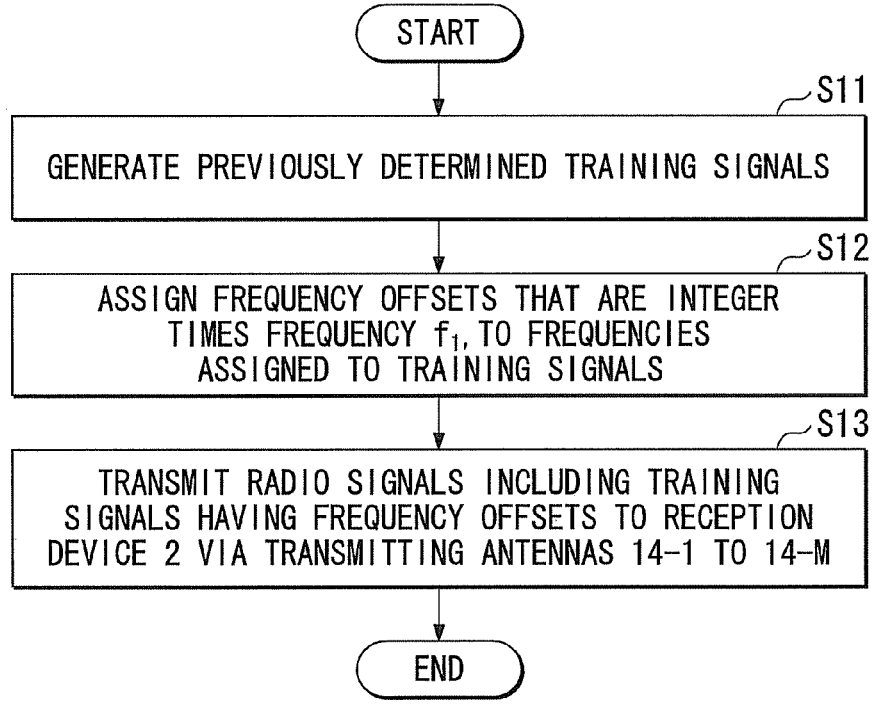
FIG. 4 is a flowchart showing a process in a transmission device 1 according to the first embodiment of the present invention.

FIG. 4 is a flowchart showing a process in the transmission device 1 according to the first embodiment of the present invention.

First, the training signal sequence generation unit 11 generates a training signals previously determined in the transmission device 1 (step S11).

Next, the frequency offset assignment units 12-1 to 12-M assign frequency offsets that are integer times the frequency $f_1$, to frequencies assigned to training signals branched in the same number as the number of the plurality of transmitting antennas 14-1 to 14-M (step S12).

Next, the radio units 13-1 to 13-M transmit radio signals including the training signals having the frequency offsets assigned by the frequency offset assignment units 12-1 to 12-M to the reception device 2 via the transmitting antennas 14-1 to 14-M (step S13).

Figure 5:
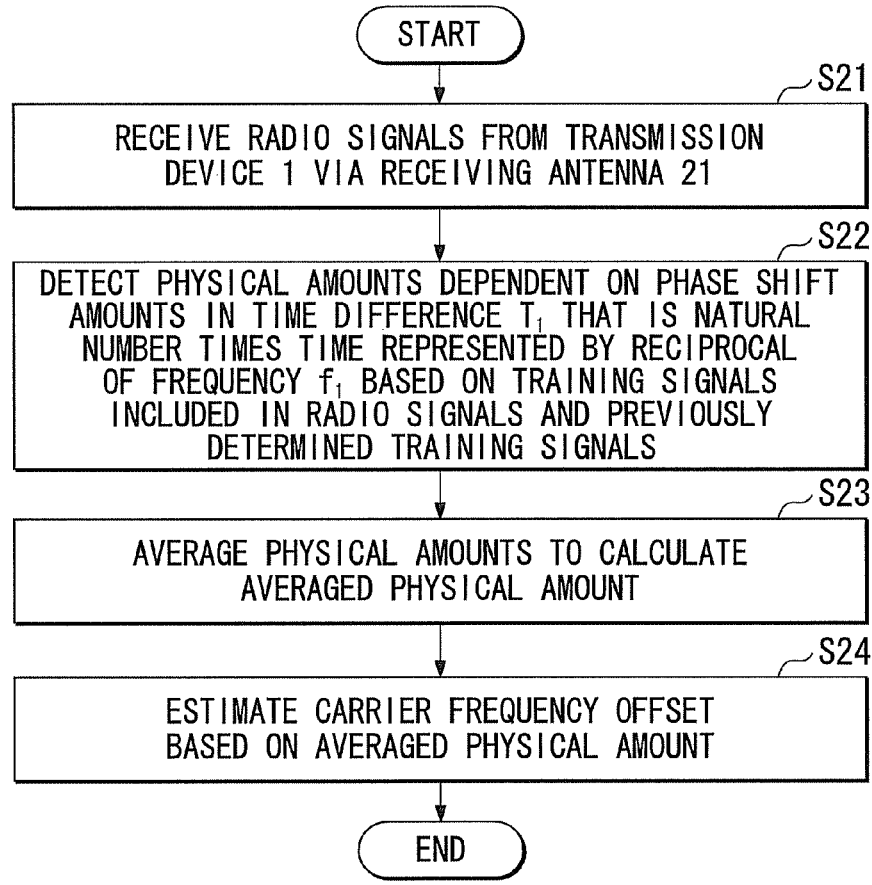
FIG. 5 is a flowchart showing a process in a reception device 2 according to the first embodiment of the present invention.

FIG. 5 is a flowchart showing a process in the reception device 2 according to the first embodiment of the present invention.

First, the radio unit 22 receives the radio signals from the transmission device 1 via the receiving antenna 21 (step S21).

The phase difference detection unit 23 then detects physical amounts dependent on phase shift amounts in a time difference $T_1$ that is a natural number times a time represented by the reciprocal of the frequency $f_1$ based on the training signals included in the radio signals transmitted from the transmission device 1 and on training signals previously determined in the reception device 2 (step S22).

The averaging unit 2 then averages physical amounts detected in step S22 to calculate an averaged physical amount (step S23).

The frequency estimation unit 25 then estimates a carrier frequency offset based on the averaged physical amount (step S24).

(Second Embodiment)

Hereinafter, a second embodiment of the present invention will be described with reference to the accompanying drawings.

Figure 6:
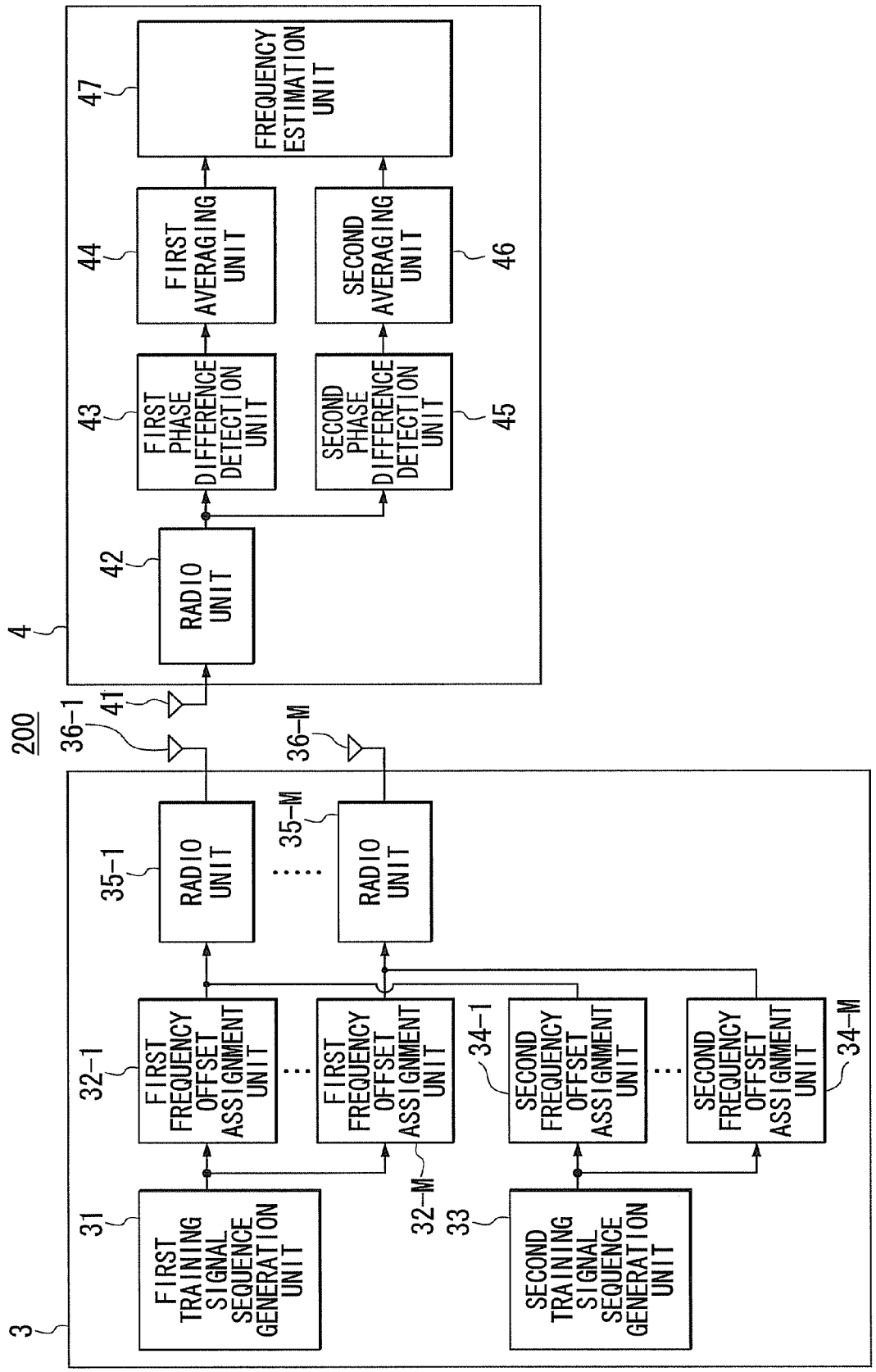
FIG. 6 is a block diagram showing a radio communication system 200 according to a second embodiment.

FIG. 6 is a schematic block diagram showing a radio communication system 200 according to the present embodiment.

Figure 7:
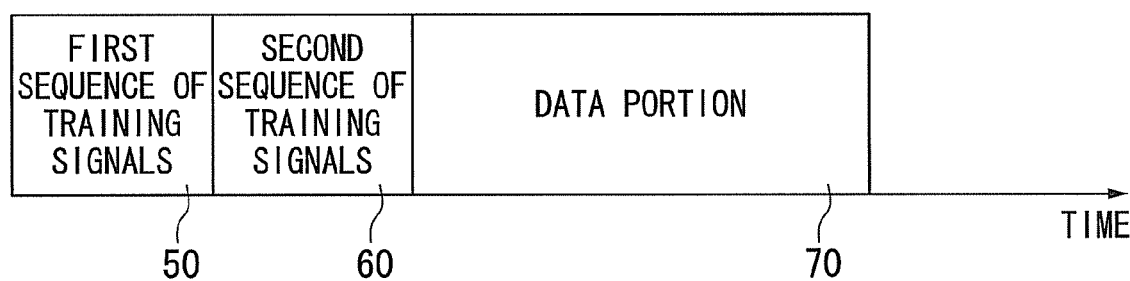
FIG. 7 shows a transmission signal format in the radio communication system 200 according to the second embodiment.

FIG. 7 is a diagram showing an example of a transmission signal format in the radio communication system 200.

The radio communication system 200 shown in FIG. 6 includes a transmission device 3 and a reception device 4.

The transmission device 3 includes a first training signal sequence generation unit 31, first frequency offset assignment units 32-1 to 32-M, a second training signal sequence generation unit 33, second frequency offset assignment units 34-1 to 34-M, radio units 35-1 to 35-M, and transmitting antennas 36-1 to 36-M, wherein M is an integer equal to or greater than 2.

The first training signal sequence generation unit 31 generates a first previously determined sequence of training signals and outputs the first sequence of training signals to the frequency offset assignment units 32-1 to 32-M.

The first frequency offset assignment units 32-1 to 32-M assign frequency offsets that are integer times a frequency $f_1$ to the first sequence of training signals generated by the first training signal sequence generation unit 31, and output the resultant training signals to the radio units 35-1 to 35-M.

The second training signal sequence generation unit 33 generates a second previously determined sequence of training signals and outputs the second sequence of training signals to the second frequency offset assignment units 34-1 to 34-M.

The second frequency offset assignment units 34-1 to 34-M assign frequency offsets of which absolute values are smaller than half of the reciprocal of a time difference $T_1$ to the second sequence of training signals generated by the second training signal sequence generation unit 33, and output the resultant training signals to the radio units 35-1 to 35-M.

The radio units 35-1 to 35-M time-division-multiplex the first sequence of training signals generated by the first training signal sequence generation unit 31 and assigned the frequency offsets by the first frequency offset assignment units 32-1 to 32-M, and the second sequence of training signals generated by the second training signal sequence generation unit 33 and assigned the frequency offsets by the second frequency offset assignment units 34-1 to 34-M, perform analog conversion and frequency conversion on the time-division-multiplexed training signals, and output radio signals to the transmitting antennas 36-1 to 36-M.

The transmitting antennas 36-1 to 36-M transmit the radio signals output from the radio units 35-1 to 35-M to the reception device 4.

For example, as in the transmission signal format shown in FIG. 7, the first sequence of training signals 50 and the second sequence of training signals 60 are continuously transmitted in a way so as not to overlap each other temporally prior to transmission of a data portion 70. In FIG. 7, the horizontal axis is a time axis. The transmission signal format shown in FIG. 7 is a signal format in which the first sequence of training signals 50, the second sequence of training signals 60, and the data portion 70 are transmitted in this order.

A connection of the components of the transmission device 3 and a signal flow will be described.

The first training signal sequence generation unit 31 has an output terminal connected to input terminals of the first frequency offset assignment units 32-1 to 32-M. The first training signal sequence generation unit 31 branches the first sequence of generated training signals and outputs the first sequence of training signals to the first frequency offset assignment units 32-1 to 32-M.

The first frequency offset assignment units 32-1 to 32-M have the input terminals connected to the output terminal of the first training signal sequence generation unit 31, and output terminals connected to first input terminals of the radio units 33-1 to 33-M in a one-to-one correspondence. The first frequency offset assignment units 32-1 to 32-M assign frequency offsets to the first sequence of input training signals, and output the resultant training signals to the radio units 35-1 to 35-M.

The second training signal sequence generation unit 33 has an output terminal connected to input terminals of the second frequency offset assignment units 34-1 to 34-M. The second training signal sequence generation unit 33 branches the second sequence of generated training signals and outputs the second sequence of training signals to the second frequency offset assignment units 34-1 to 34-M.

The second frequency offset assignment units 34-1 to 34-M have the input terminals connected to the output terminal of the second training signal sequence generation unit 33, and output terminals connected to second input terminals of the radio units 35-1 to 35-M in a one-to-one correspondence. The second frequency offset assignment units 34-1 to 34-M assign the frequency offsets to the second sequence of input training signals and output the resultant training signals to the radio units 35-1 to 35-M.

The radio units 35-1 to 35-M have the first input terminals connected to the output terminals of the frequency offset assignment units 32-1 to 32-M, and the second input terminals connected to the output terminals of frequency offset assignment units 34-1 to 34-M. The radio units 35-1 to 35-M have output terminals connected to input terminals of the transmitting antennas 36-1 to 36-M in a one-to-one correspondence. The radio units 35-1 to 35-M perform conversion on the input training signals assigned the frequency offsets to generate radio signals and transmit the radio signals to the reception device 4 via the transmitting antennas 36-1 to 36-M.

The reception device 4 includes a receiving antenna 41, a radio unit 42, a first phase difference detection unit 43, a first averaging unit 44, a second phase difference detection unit 45, a second averaging unit 46, and a frequency estimation unit 47.

The receiving antenna 41 receives the radio signals transmitted from the transmission device 3 and outputs the radio signals to the radio unit 42.

The radio unit 42 performs frequency conversion and digital conversion on the radio signals received by the receiving antenna 41 to generate reception signals, and outputs the reception signals to the first phase difference detection unit 43 and the second phase difference detection unit 45.

The first phase difference detection unit 43 compares the reception signal input from the radio unit 42 with a first previously determined sequence of training signals to detect first physical amounts that are a function of phase shift amounts in a time difference $T_1$, and outputs the first physical amounts to the first averaging unit 44.

The first averaging unit 44 averages the first input physical amounts in order to avoid effects of noise and outputs a first averaged physical amount to the frequency estimation unit 47.

The second phase difference detection unit 45 compares the reception signal input from the radio unit 42 with a second previously determined sequence of training signals to detect second physical amounts that are a function of phase shift amounts in a time difference $T_2$ that is shorter than a time difference $T_1$, and outputs the second physical amounts to the second averaging unit 46.

The second averaging unit 46 averages the second input physical amounts in order to avoid effects of noise and outputs a second averaged physical amount to the frequency estimation unit 47.

The frequency estimation unit 47 estimates the carrier frequency offset from the first averaged physical amount input by the first averaging unit 44 and the second averaged physical amount input by the second averaging unit 46.

A connection of the components of the reception device 4 and a signal flow will be described.

The receiving antenna 41 has an output terminal connected to an input terminal of the radio unit 42. The receiving antenna 41 outputs the received radio signal to the radio unit 42.

The radio unit 42 has the input terminal connected to the output terminal of the receiving antenna 41, and an output terminal connected to an input terminal of the first phase difference detection unit 43 and an input terminal of the second phase difference detection unit 45. The radio unit 42 outputs the reception signals generated from the radio signals received by the receiving antenna 21 to the first phase difference detection unit 43 and the first phase difference detection unit 45.

The first phase difference detection unit 43 has the input terminal connected to the output terminal of the radio unit 42 and an output terminal connected to the first averaging unit 44. The first phase difference detection unit 43 extracts the first sequence of training signals from the reception signal input from the radio unit 42, and outputs physical amounts, which are represented by a function of the phase shift amounts, obtained by comparing the first sequence of extracted training signals and a first previously determined sequence of training signals to the first averaging unit 44.

The first averaging unit 44 has an input terminal connected to the output terminal of the first phase difference detection unit 43, and an output terminal connected to a first input terminal of the frequency estimation unit 47. The first averaging unit 44 outputs an averaged physical amount obtained by performing an averaging process on the physical amounts input from the first phase difference detection unit 43, to the frequency estimation unit 47.

The second phase difference detection unit 45 has the input terminal connected to the output terminal of the radio unit 42, and an output terminal connected to the second averaging unit 46. The second phase difference detection unit 45 extracts the second sequence of training signals from the reception signal input from the radio unit 42, and outputs physical amounts, which are represented by a function of the phase shift amounts, obtained by comparing the second sequence of extracted training signals and a second previously determined sequence of training signals to the second averaging unit 46.

The second averaging unit 46 has an input terminal connected to the output terminal of the second phase difference detection unit 45, and an output terminal connected to a second input terminal of the frequency estimation unit 47. The second averaging unit 46 outputs an averaged physical amount obtained by performing an averaging process on the physical amount input from the second phase difference detection unit 45, to the frequency estimation unit 47.

The first input terminal of the frequency estimation unit 47 is connected to the output terminal of the first averaging unit 44, and the second input terminal is connected to the output terminal of the second averaging unit 46. The frequency estimation unit 47 estimates the carrier frequency offset based on the respective input averaged physical amounts, and outputs the estimation result.

In the method of estimating the carrier frequency offset in the first embodiment of the present invention, when the transmitting antenna number M is great from the relationships of Formulas 14, 19 and 27, the delay sample number $\tau_1$ upon the phase difference shift estimation is great and an acquisition frequency range is restricted.

In the second embodiment, the transmission device 3 further includes the second training signal sequence generation unit 33, and the second frequency offset assignment units 34-1 to 34-M for assigning the frequency offsets to the second sequence of generated training signals, unlike the method of estimating the carrier frequency offset in the first embodiment. The reception device 4 further includes the second phase difference detection unit 45 for detecting the second phase shift amounts with a small delay sample number using the second sequence of training signals, and the second averaging unit 46 for averaging the second detected phase shift amounts. Accordingly, the second embodiment realizes a wide acquisition range.

Next, an operational principle of a carrier frequency offset estimation system in the second embodiment of the present invention will be described using formulas.

The first training signal sequence generation unit 31 performs the same operation as the training signal sequence generation unit 11. The first frequency offset assignment units 32-1 to 32-M perform the same operation as the frequency offset assignment units 12-1 to 12-M. The first phase difference detection unit 43 performs the same operation as the phase difference detection unit 23. The first averaging unit 44 performs the same operation as the averaging unit 24. Accordingly, in the second embodiment, the first averaged physical amount $\phi_1$ shown in Formulas 20 and 21 or Formulas 25 and 26 in the first embodiment is obtained.

n is a sample number. The second sequence of training signals generated by the second training signal sequence generation unit 33 is $s_2(n)$. The second training signals $x_{2m}(n)$ assigned the frequency offsets by the frequency offset assignment unit 34-*m* may be expressed by Formula 31 when the frequency offsets are assigned to be at regular intervals represented by the frequency $f_2$. Here, symbol m denotes a natural number from 1 to M.

[Formula 31]

$$x_{2m}(n) = s_2(n) \cdot \exp\left(j \cdot 2\pi \cdot \frac{m \cdot f_2}{f_s} \cdot n\right) \quad (31)$$

In Formula 31, symbol $f_s$ denotes a sampling frequency.

Hereinafter, for simplification of explanation, all will be described in a sample unit.

In this case, a reception signal $y_2(n)$ generated through the reception in the receiving antenna 41 and the frequency conversion and digital conversion in the radio unit 42 may be expressed by Formula 32.

[Formula 32]

$$y_2(n) = \sum_{m=1}^{M} h_m \cdot x_{2m}(n) + \eta_2(n) \quad (32)$$
$$= s_2(n) \cdot \exp\left(j \cdot 2\pi \cdot \frac{\Delta f}{f_s} \cdot n\right) \cdot \beta_2(n) + \eta_2(n)$$

In Formula 32, symbol $h_m$ denotes a complex amplitude response between the transmitting antenna 36-*m* (symbol m denotes a natural number from 1 to M) and the receiving antenna 41. Symbol $\Delta f$ denotes a carrier frequency offset between the transmission device 3 and the reception device 4. Symbol $f_s$ denotes the sampling frequency. $\eta_2(n)$ is a noise independent for each sample and dependent on the complex Gaussian distribution in which an average power amount is 1.

When the training signal s(n) is $S_2(n)$, Formula 32 is obtained by replacing the phase amplitude response h of Formula 1 with a time-varying variable $\beta_2(n)$. $\beta_2(n)$ may be considered a variable corresponding to the phase amplitude response and may be expressed by Formula 33.

[Formula 33]

$$\beta_2(n) = \sum_{m=1}^{M} h_m \cdot \exp\left(j \cdot 2\pi \cdot \frac{m \cdot f_2}{f_s} \cdot n\right) \quad (33)$$

In the second embodiment of the present invention, the carrier frequency offset estimation system provides both a wide acquisition range and a high estimation accuracy. Accordingly, the second phase difference detection unit 45, the second averaging unit 46, and the frequency estimation unit 47 calculate a rough carrier frequency offset estimate $f'_{est}$. Thereafter, the first phase difference detection unit 43, the first averaging unit 44, and the frequency estimation unit 47 further estimate a remaining carrier frequency offset after effects of the rough carrier frequency offset estimate $f'_{est}$ are removed.

The second phase difference detection unit 45, the second averaging unit 46, and the frequency estimation unit 47 calculate the rough carrier frequency offset estimate $f'_{est}$ using the reception signal $y_2(n)$ generated from the received radio signal and the second previously determined sequence of training signals $s_2(n)$ generated by the second training signal sequence generation unit 33. Thereafter, the frequency estimation unit 47 obtains the carrier frequency offset estimate $f_{est}$ based on Formula 34 using the obtained rough carrier frequency offset estimate $f'_{est}$ and the first averaged physical amount $\phi_1$.

[Formula 34]

$$f_{est} = f'_{est} + \frac{f_s}{2\pi \cdot \tau_1} \cdot \tan^{-1}\left(\frac{\text{Im}[\Phi'_1]}{\text{Re}[\Phi'_1]}\right) \quad (34)$$

In Formula 34, the variable $\phi'_1$ is an average of physical amounts of phase shift amounts in a time difference $\tau_1$ sample remaining after the phase shift amount corresponding to the rough carrier frequency offset estimate $f'_{est}$ is corrected.

That is, the variable $\phi'_1$ may be expressed by Formula 35.

[Formula 35]

$$\Phi'_1 = \Phi_1 \cdot \exp\left(j \cdot 2\pi \cdot \frac{f'_{est}}{f_s} \cdot \tau_1\right) \quad (35)$$

An error of the rough carrier frequency offset estimate $f'_{est}$ is caused by effects of the frequency offsets assigned to the second sequence of training signals and effects of noise $\eta_2(n)$. For simplification of explanation, the effects of the noise $\eta_2(n)$ are neglected, and the estimation error caused by only the effects of the frequency offset is considered hereinafter.

When the second phase difference detection unit 45 uses delay-detection-type phase difference detection, a phase shift amount $z_2(n)$ in a delay sample number $\tau_2$ sample (where $\tau_2 = f_s T_2$) may be expressed by Formula 36.

[Formula 36]

$$\begin{aligned} z_2(n) &= s_2^*(n) \cdot s_2(n-\tau_2) \cdot y_2(n) \cdot y_2^*(n-\tau_2) \quad (36) \\ &= \exp\left(j \cdot 2\pi \cdot \frac{\Delta f}{f_s} \cdot \tau_2\right) \cdot \beta_2(n) \cdot \beta_2^*(n-\tau_2) \\ &= \exp\left(j \cdot 2\pi \cdot \frac{\Delta f}{f_s} \cdot \tau_2\right) \cdot \left\{\sum_{m=1}^{M} |h_m|^2 \cdot \exp\left(j \cdot 2\pi \cdot \frac{m \cdot f_2}{f_s} \cdot \tau_2\right) + \right. \\ & \sum_{i=1}^{M-1} \sum_{k=i+1}^{M-1} h_{k-i} \cdot h_k^* \cdot \exp\left(j \cdot 2\pi \cdot \frac{k \cdot f_2}{f_s} \cdot \tau_2\right) \cdot \\ & \exp\left(j \cdot 2\pi \cdot \frac{(k-i) \cdot f_2}{f_s} \cdot n\right) + \sum_{i=2}^{M} \sum_{k=1}^{i-1} h_{k-i} \cdot h_k^* \cdot \\ & \left. \exp\left(j \cdot 2\pi \cdot \frac{k \cdot f_2}{f_s} \cdot \tau_2\right) \cdot \exp\left(j \cdot 2\pi \cdot \frac{(k-i) \cdot f_2}{f_s} \cdot n\right)\right\} \end{aligned}$$

The second averaging unit 46 averages the second physical amounts $z_2(n)$ of $N_2$ samples that are natural number times the $f_s/f_2$ samples corresponding to one period of the variable $\beta_2(n)$ to calculate the second averaged physical amount $\phi_2$. The second averaged physical amount $\phi_2$ may be expressed by Formula 37.

[Formula 37]

$$\begin{aligned} \Phi_2 &= \sum_{n=1}^{N_2} z_2(n) \quad (37) \\ &= \exp\left(j \cdot 2\pi \cdot \frac{\Delta f}{f_s} \cdot \tau_2\right) \cdot \left\{\sum_{n=1}^{M} |h_m|^2 \cdot \exp\left(j \cdot 2\pi \cdot \frac{m \cdot f_2}{f_s} \cdot \tau_2\right)\right\} \end{aligned}$$

When the second phase difference detection unit 45 uses the delay-detection-type phase difference detection, the frequency estimation unit 47 calculates a rough carrier frequency offset estimate $f'_{est}$ based on Formula 38.

[Formula 38]

$$f'_{est} = \frac{f_s}{2\pi \cdot \tau_2} \cdot \tan^{-1}\left(\frac{\text{Im}[\Phi_2]}{\text{Re}[\Phi_2]}\right) \quad (38)$$

The acquisition range in which the estimation of the rough carrier frequency offset estimate $f'_{est}$ is allowed is defined by Formula 39.

[Formula 39]

$$-\frac{f_s}{2\tau_2} < f'_{est} < \frac{f_s}{2\tau_2} \quad (39)$$

In the second embodiment, since the acquisition range of the rough carrier frequency offset estimate $f'_{est}$ shown in Formula 39 is wider than that of the carrier frequency offset estimation unit 25 in the first embodiment shown in Formula 30, $\tau_2 > \tau_1$ is set.

In the carrier frequency offset estimation using the second averaged physical amount $\phi_2$ of the second embodiment, a small value may be used for the delay sample number $\tau_2$ even when the antenna number M is great, unlike the carrier frequency offset estimation using the first averaged physical amount $\phi_1$ in the second embodiment.

Accordingly, the acquisition range shown in Formula 39 can be sufficiently broadened.

The carrier frequency offset estimation accuracy in the second embodiment of the present invention is the same as that in the first embodiment. That is, even when the second embodiment is used, the same effects as those in the first embodiment described in FIGS. 2 and 3 can be achieved.

In the present embodiment, two or more of the plurality of second frequency offset assignment units 34-1 to 34-M may assign the same frequency offset. Even in this case, the system in the present embodiment can operate normally. However, when all the second frequency offset assignment units 34-1 to 34-M assign the same frequency, only the same effect as the first embodiment is obtained. Accordingly, it is preferable that the second frequency offset assignment units 34-1 to 34-M assign two or more frequency offsets.

From Formulas 34 and 36, the estimation error of $f'_{est}$ is maximized when the reception level $h_M$ is sufficiently greater than the other reception levels $h_1$ to $h_{m-1}$. In this case, the estimation error is $M \cdot f_2$. That is, the estimation error is a maximum value of the absolute values of the frequency offsets assigned by the second frequency offset assignment units 34-1 to 34-M.

Accordingly, the frequency offsets are assigned so that all the frequency offsets assigned by the second frequency offset assignment units 34-1 to 34-M are in an acquisition range of carrier frequency offset estimation using the first averaged physical amount $\phi_1$ in the first embodiment. That is, the frequency offsets are assigned so that absolute values of all the assigned frequency offsets are smaller than $f_s/2\tau_1$. Accordingly, both a wide acquisition range and high estimation accuracy can be achieved.

The second offset assignment units 34-1 to 34-M assign the frequency offsets so that all the assigned frequency offsets are integer times the frequency $f_2$. Accordingly, the value of the variable $\beta_2(n)$ can vary with $f_s/f_2$ samples. Further, the second averaging unit 46 averages the second physical amounts $z_2(n)$ of $N_2$ samples that are natural number times the $f_s/f_2$ samples corresponding to one period of a variation period of the variable $\beta_2(n)$. Accordingly, the averaging in which a physical amount with high accuracy is necessarily included is performed. Accordingly, the frequency estimation unit 47 can improve the carrier frequency offset estimation accuracy corresponding to the averaging sample number $N_2$.

When the second phase difference detection unit 45 uses delay-detection-type phase difference detection, a phase component of a physical amount $z_2(n)$ indicates the detected phase difference. Further, the amplitude component indicates a square of the absolute value of the variable $\beta_2(n)$, that is, the reliability of the detected phase difference.

Thus, as the second phase difference detection unit 45 uses the delay-detection-type phase difference detection, the second averaging unit 46 automatically performs appropriate averaging corresponding to the detection accuracy for the phase difference. Accordingly, the frequency estimation unit 47 can estimate the carrier frequency offset with high accuracy.

While the second phase difference detection unit 45 uses the delay detection as described in the present embodiment, the present invention is not limited thereto. As the second phase difference detection unit 45, any means for detecting second physical amounts that are a function of phase shift amounts in a time difference $\tau_2$ sample may be used. For example, a phase difference detection means for obtaining the phase difference itself by subtracting a phase shift amount in a time difference of the second sequence of training signals from the phase shift amount in a time difference $\tau_2$ sample of the reception signal in a portion containing the second sequence of training signals may be used. When such a phase difference detection means is used, an operation in the phase difference detection consists of only addition and subtraction, thus simplifying a circuit configuration.

While the second averaging unit 46 averages the second physical amounts $z_2(n)$ of $N_2$ samples that are natural number times the $f_s/f_2$ samples corresponding to one period of the variable $\beta_2(n)$, as described in the present embodiment, the present invention is not limited thereto. The averaging sample number $N_2$ may have any value.

A band stop filter may be provided before the first phase difference detection unit 43 and the second phase difference detection unit 45 in order to reduce the effects of noise in the phase difference detection.

While according to the transmission signal format shown in FIG. 7, the first sequence of training signals 50 and the second sequence of training signals 60 are continuously transmitted not to overlap temporally prior to transmission of the data portion 70 as described above, the present invention is not limited thereto. The first sequence of training signals 50 and the second sequence of training signals 60 may be assigned to any time as long as the signals do not overlap temporally.

While the first sequence of training signals 50 and the second sequence of training signals 60 are time-division-multiplexed as described in the description of FIG. 7, the present invention is not limited thereto. For example, the first sequence of training signals 50 and the second sequence of training signals 60 may be multiplexed using, for example, frequency division multiplexing or code division multiplexing.

Figure 8:
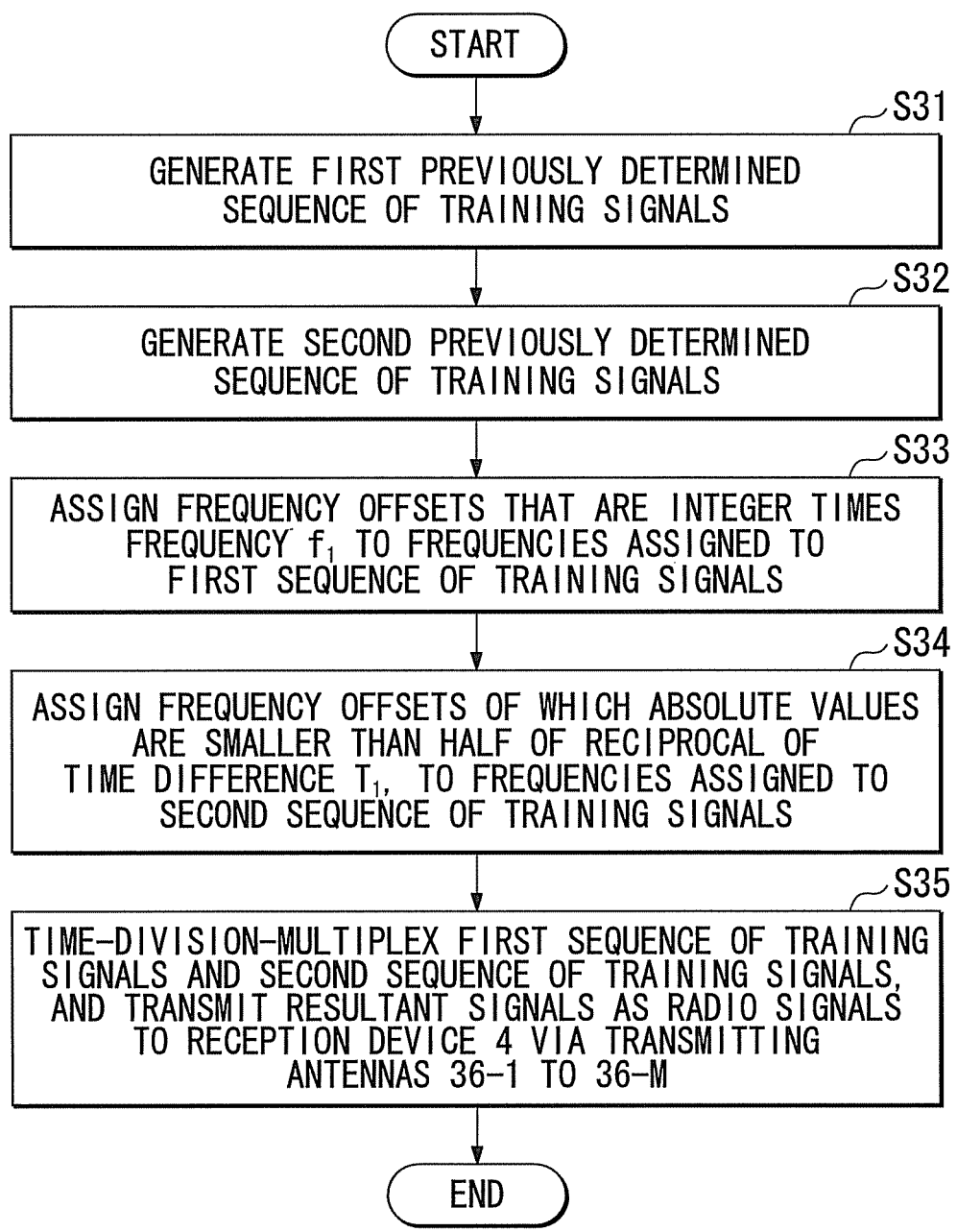
FIG. 8 is a flowchart showing a process in a transmission device 3 according to the second embodiment of the present invention.

FIG. 8 is a flowchart showing a process in the transmission device 3 according to the second embodiment of the present invention.

First, the first training signal sequence generation unit 31 generates the first sequence of training signals previously determined by the transmission device 3 (step S31).

Next, the second training signal sequence generation unit 33 generates the second sequence of training signals previously determined by the transmission device 3 (step S32).

The first frequency offset assignment units 32-1 to 32-M assign the frequency offsets that are integer times the frequency $f_1$ to frequencies assigned to the first sequence of training signals branched in the same number as the number of the plurality of transmitting antennas 36-1 to 36-M (step S33).

The second frequency offset assignment units 34-1 to 34-M then assign frequency offsets of which absolute values are smaller than half of the reciprocal of a time difference $T_1$, to frequencies assigned to the second sequence of training signals branched in the same number as the number of the plurality of transmitting antennas 36-1 to 36-M (step S34). Specifically, the second frequency offset assignment units 34-1 to 34-M assign frequency offsets so that an absolute value of the difference between all the frequency offsets is an integer times the frequency $f_2$.

Next, the radio units 35-1 to 35-M time-division-multiplex the first sequence of training signals having the frequency offsets assigned by the first frequency offset assignment units 32-1 to 32-M and the second sequence of training signals having the frequency offsets assigned by the second frequency offset assignment units 34-1 to 34-M, and transmit the resultant signals as radio signals to the reception device 4 via the transmitting antennas 36-1 to 36-M (step S35).

While the process in step S32 is performed subsequently to the process in step S31 and the process in step S34 is performed subsequently to the process in step S33 as described in FIG. 8, the present invention is not limited thereto. For example, the process in step S31 may be performed subsequently to the process in step S32, and the process in step S33 may be performed subsequently to the process in step S34. The process in step S31 and the process in step S32 may be performed simultaneously and the process in step S33 and the process in step S34 may be performed simultaneously.

Figure 9:
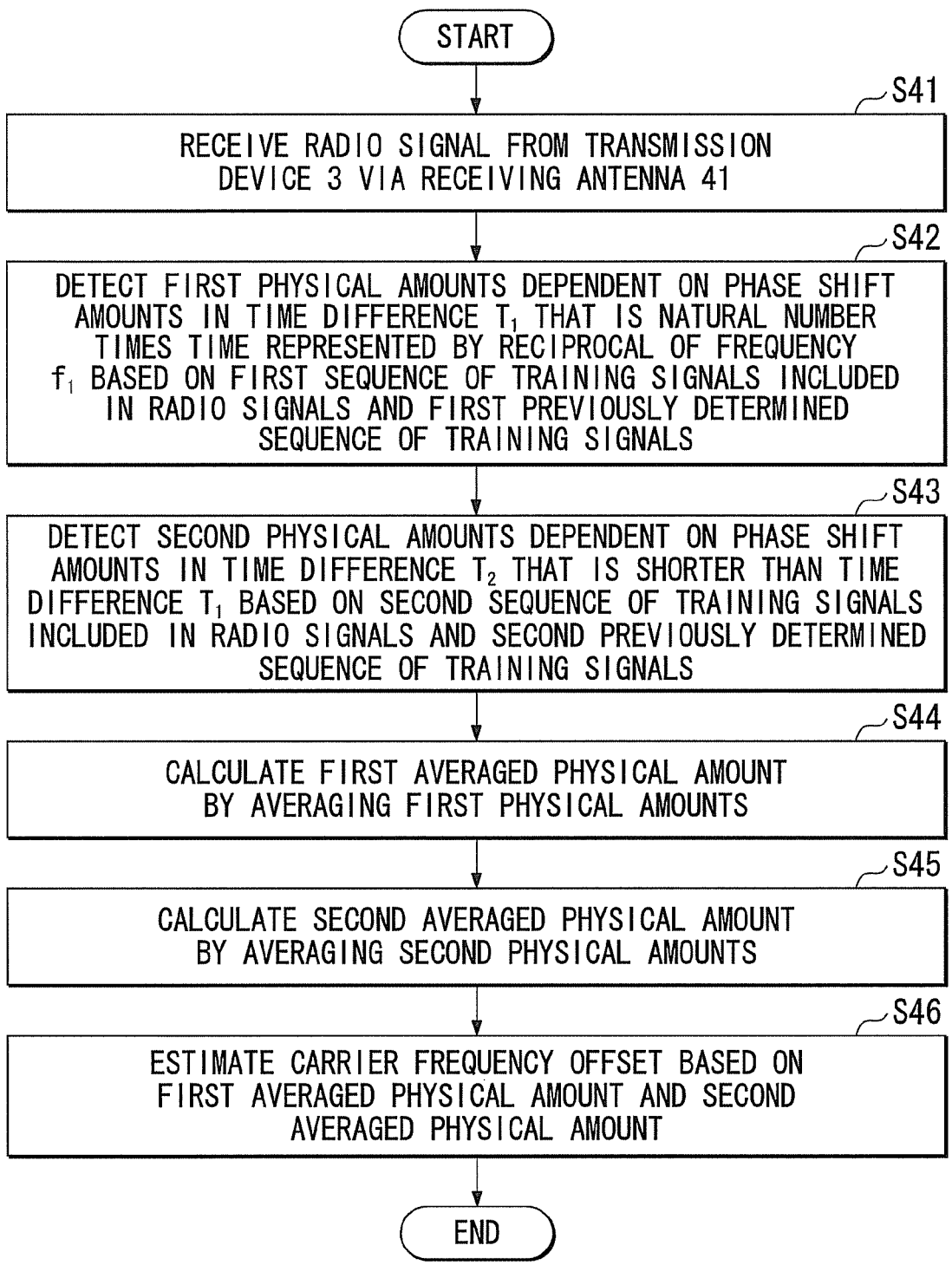
FIG. 9 is a flowchart showing a process in a reception device 4 according to the second embodiment of the present invention.

FIG. 9 is a flowchart showing a process in the reception device 4 according to the second embodiment of the present invention.

First, the radio unit 42 receives a radio signal from the transmission device 3 via the receiving antenna 41 (step S41).

Next, the first phase difference detection unit 43 detects the first physical amounts dependent on phase shift amounts in the time difference $T_1$ that is a natural number times the time represented by the reciprocal of a frequency $f_1$ based on the first sequence of training signals included in the radio signals transmitted from the transmission device 3 and a first sequence of training signals previously determined in the reception device 4 (step S42).

The second phase difference detection unit 45 then detects the second physical amounts dependent on phase shift amounts in a time difference $T_2$ that is shorter than the time difference $T_1$ based on the second sequence of training signals included in the radio signals transmitted from the transmission device 3 and a second sequence of training signals previously determined in the reception device 4 (step S43).

The first averaging unit 44 then calculates the first averaged physical amount by averaging the first physical amounts detected in step S42 (step S44).

The second averaging unit 46 then calculates the second averaged physical amount by averaging the second physical amounts detected in step S43 (step S45). Specifically, the second averaging unit 46 averages the second physical amounts in a range of times that are natural number times the reciprocal of the frequency $f_2$.

Next, the frequency estimation unit 47 estimates the carrier frequency offset based on the first averaged physical amount calculated in step S44 and the second averaged physical amount calculated in step S45 (step S46).

While the process in step S43 is performed subsequently to the process in step S42 and the process in step S45 is performed subsequently to the process in step S44 as described in FIG. 9, the present invention is not limited thereto. For example, the process in step S42 may be performed subsequently to the process in step S43 and the process in step S44 may be performed subsequently to the process in step S45. Alternatively, the process in step S42 and the process in step S43 may be performed simultaneously and the process in step S44 and the process in step S45 may be performed simultaneously.

(Third Embodiment)

Hereinafter, a third embodiment of the present invention will be described with reference to the accompanying drawings.

Figure 10:
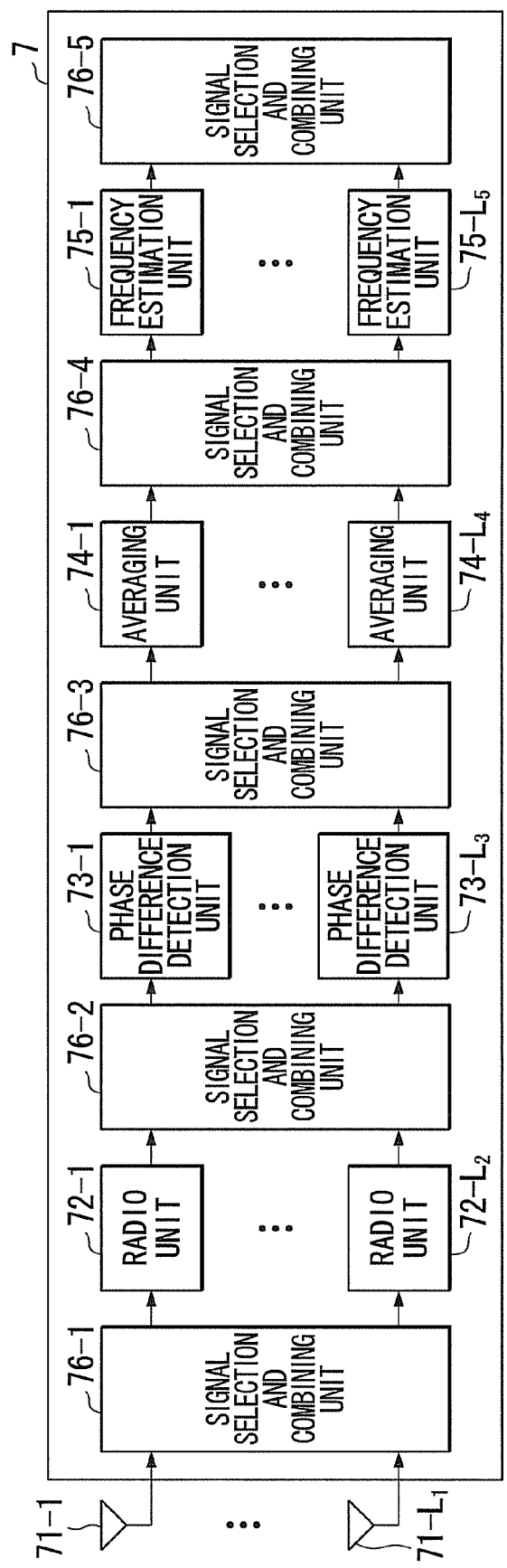
FIG. 10 is a schematic block diagram showing a reception device 7 according to a third embodiment of the present invention.

FIG. 10 is a schematic block diagram showing a reception device 7 according to the third embodiment of the present invention.

A transmission device communicating with the reception device 7 is the same as the transmission device 1 (FIG. 1) in the first embodiment, and components, a connection of the components, and a signal flow are the same as those in the first embodiment.

The reception device 7 includes receiving antennas 71-1 to 71-$L_1$, radio units 72-1 to 72-$L_2$, phase difference detection units 73-1 to 73-$L_3$, averaging units 74-1 to 74-$L_4$, frequency estimation units 75-1 to 75-$L_5$, and signal selection and combining units 76-1 to 76-5.

The receiving antennas 71-1 to 71-$L_1$ receive the radio signals transmitted from the transmission device 1 and output the radio signals to the signal selection and combining unit 76-1.

The signal selection and combining unit 76-1 selects or combines the radio signals received by the receiving antennas 71-1 to 71-$L_1$ in order to avoid effects of noise by a reception diversity effect, and outputs the resultant radio signals to the radio units 72-1 to 72-$L_2$.

The radio units 72-1 to 72-$L_2$ perform frequency conversion and digital conversion on the radio signals output by the signal selection and combining unit 76-1 to generate reception signals, and output the reception signals to the signal selection and combining unit 76-2.

The signal selection and combining unit 76-2 selects or combines the reception signals generated by the radio units 72-1 to 72-$L_2$ in order to avoid the effects of noise by the reception diversity effect, and outputs the resultant reception signals to the phase difference detection units 73-1 to 73-$L_3$.

The phase difference detection units 73-1 to 73-$L_3$ compare the reception signal generated by the signal selection and combining unit 76-1 with a previously determined sequence of training signals to detect physical amounts represented by a function of phase shift amounts in a time difference $T_1$ that is a natural number times a time represented by the reciprocal of a frequency $f_1$, and outputs the physical amounts to the signal selection and combining unit 76-3.

The signal selection and combining unit 76-3 selects or combines the physical amounts output from the phase difference detection units 73-1 to 73-$L_3$ in order to avoid the effects of noise by the reception diversity effect, and outputs the resultant physical amounts to the averaging 74-1 to 74-$L_4$.

The averaging 74-1 to 74-$L_4$ average the physical amounts output from the signal selection and combining unit 76-3 in order to avoid the effects of noise, and output averaged physical amounts to the signal selection and combining unit 76-4.

The signal selection and combining unit 76-4 selects or combines the averaged physical amounts output from the averaging 74-1 to 74-$L_4$ in order to avoid the effects of noise by the reception diversity effect, and outputs the resultant averaged physical amounts to the frequency estimation units 75-1 to 75-$L_5$.

The frequency estimation units 75-1 to 75-$L_5$ estimate carrier frequency offsets based on the averaged physical amounts output from the signal selection and combining unit 76-4, and output the carrier frequency offsets to the signal selection and combining unit 76-5.

The signal selection and combining unit 76-5 selects or combines the carrier frequency offsets estimated by the frequency estimation units 75-1 to 75-$L_5$ in order to avoid the effects of noise by the reception diversity effect.

In the present embodiment, when a receiving antenna number $L_1$ is 1 or when the receiving antenna number $L_1$ is equal to a radio unit number $L_2$, the signal selection and combining unit 76-1 may be omitted.

When the radio unit number $L_2$ is 1 or when the radio unit number $L_2$ is equal to a phase difference detection unit number $L_3$, the signal selection and combining unit 76-2 may be omitted.

When the phase difference detection unit number $L_3$ is 1 or when the phase difference detection unit number $L_3$ is equal to an averaging unit number $L_4$, the signal selection and combining unit 76-3 may be omitted.

When the averaging unit number $L_4$ is 1 or when the averaging unit number $L_4$ is equal to a frequency estimation unit number $L_5$, the signal selection and combining unit 76-4 may be omitted.

When the frequency estimation unit number $L_5$ is 1, the signal selection and combining unit 76-5 may be omitted.

The signal selection units 76-1 to 76-5 select and output three high level signals from five input signals or divide six input signals by two signals, combine the two signals, and output three signals.

In the method of estimating a carrier frequency offset in the first embodiment of the present invention, a transmission diversity effect can be obtained since a transmitting antenna number is 2 or more, but the reception diversity cannot be obtained since the receiving antenna number is 1.

In the third embodiment, a plurality of receiving antennas are provided in comparison with the first embodiment. The reception device 7 includes the signal selection and combining unit 76-1 for selecting or combining a plurality of radio signals received by the plurality of receiving antennas 71-1 to 71-$L_1$. The reception device 7 further includes the signal selection and combining unit 76-2 for selecting or combining a plurality of reception signals generated from the radio signals.

The reception device 7 further includes the signal selection and combining unit 76-3 for selecting or combining a plurality of physical amounts represented by a function of the phase shift amounts calculated from the reception signal. The reception device 7 further includes the signal selection and combining unit 76-4 for selecting or combining a plurality of averaged physical amounts obtained by averaging the physical amounts represented by a function of the phase shift amounts. The reception device 7 further includes the signal selection and combining unit 76-5 for selecting or combining a plurality of carrier frequency offsets estimated from the averaged physical amounts.

Accordingly, the carrier frequency offset is realized with high accuracy by the reception diversity effect.

Next, an operational principle of a carrier frequency offset estimation system in the third embodiment of the present invention will be described using formulas. For simplification of explanation, a case in which the receiving antenna number $L_1$, the radio unit number $L_2$, the phase difference detection unit number $L_3$, and the averaging unit number $L_4$ are L, and the frequency estimation unit number $L_5$ is 1 will be described hereinafter. A configuration in which the signal selection and combining units 76-1, 76-2, 76-3, and 76-5 have been omitted will be described. A reception device 7a having such a configuration will be described with reference to FIG. 11.

Figure 11:
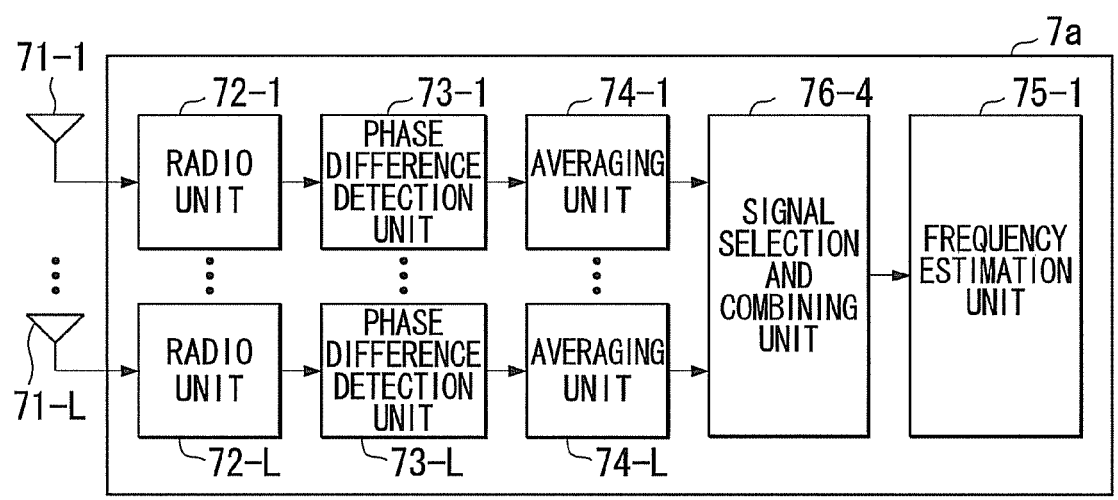
FIG. 11 is a schematic block diagram showing a reception device 7a according to the third embodiment of the present invention.

FIG. 11 is a schematic block diagram showing the reception device 7a. The case where the signal selection and combining unit 76-4 performs simple combining using the averaged physical amount $\Phi_{1l}$ calculated by the averaging unit 74-1 (symbol 1 denotes a natural number from 1 to L) as a weight coefficient 1 will be described.

Each of receiving antennas 71-1 to 71-L performs the same operation as the receiving antenna 21. Each of radio units 72-1 to 72-L performs the same operation as the radio unit 22. Each of phase difference detection units 73-1 to 73-L performs the same operation as the phase difference detection unit 23. Each of averaging units 74-1 to 74-L performs the same operation as the averaging unit 24.

Accordingly, the averaged physical amounts $\Phi_{1l}$ calculated by the averaging unit 74-1 (symbol 1 denotes a natural number from 1 to L) may be expressed as Formulas 40 and 41, as in Formulas 25 and 26.

[Formula 40]

$$\Phi_{1l} = \exp\left(j \cdot 2\pi \cdot \frac{\Delta f}{f_s} \cdot \tau_1\right) \quad (40)$$

$$\left\{N_1 \cdot \sum_{m=1}^{M} |h_{ml}|^2 + \sqrt{(2N_1 - \tau_1) \cdot \sum_{m=1}^{M} |h_{ml}|^2 + \frac{N_1}{2}} \cdot \eta_r + j \cdot \sqrt{\tau_1 \cdot \sum_{m=1}^{M} |h_{ml}|^2 + \frac{N_1}{2}} \cdot \eta_i\right\}$$

[Formula 41]

$$\Phi_{1l} = \quad (41)$$

$$\exp\left(j \cdot 2\pi \cdot \frac{\Delta f}{f_s} \cdot \tau_1\right)\left\{N_1 \cdot \sum_{m=1}^{M} |h_{ml}|^2 + \sqrt{N_1 \cdot \sum_{m=1}^{M} |h_{ml}|^2 + \frac{N_1}{2}} \cdot \eta_r + j \cdot \sqrt{N_1 \cdot \sum_{m=1}^{M} |h_{ml}|^2 + \frac{N_1}{2}} \cdot \eta_i\right\}$$

In Formulas 40 and 41, symbol $h_{ml}$ denotes a complex amplitude response between the transmitting antenna 14-*m* (symbol m denotes a natural number from 1 to M) and the receiving antenna 71-1 (symbol 1 denotes a natural number from 1 to L).

The signal selection and combining unit 76-4 performs simple combining using the averaged physical amount $\Phi_{1l}$ calculated by the averaging unit 74-1 (symbol 1 denotes a natural number from 1 to L) as a weight coefficient 1. Accordingly, the combined averaged physical amount $\Phi_{1l}$ is expressed by Formulas 42 and 43.

[Formula 42]

$$\Phi_{1l} = \exp\left(j \cdot 2\pi \cdot \frac{\Delta f}{f_s} \cdot \tau_1\right) \quad (42)$$

$$\left\{N_1 \cdot \sum_{l=1}^{L}\sum_{m=1}^{M} |h_{ml}|^2 + \sqrt{(2N_1 - \tau_1) \cdot \sum_{l=1}^{L}\sum_{m=1}^{M} |h_{ml}|^2 + \frac{N_1}{2}} \cdot \eta_r + j \cdot \sqrt{\tau_1 \cdot \sum_{l=1}^{L}\sum_{m=1}^{M} |h_{ml}|^2 + \frac{N_1}{2}} \cdot \eta_i\right\}$$

[Formula 43]

$$\Phi_l = \exp\left(j \cdot 2\pi \cdot \frac{\Delta f}{f_s} \cdot \tau_1\right) \quad (43)$$

$$\left\{N_1 \cdot \sum_{l=1}^{L}\sum_{m=1}^{M} |h_{ml}|^2 + \sqrt{N_1 \cdot \sum_{l=1}^{L}\sum_{m=1}^{M} |h_{ml}|^2 + \frac{N_1}{2}} \cdot \eta_r + j \cdot \sqrt{N_1 \cdot \sum_{l=1}^{L}\sum_{m=1}^{M} |h_{ml}|^2 + \frac{N_1}{2}} \cdot \eta_i\right\}$$

The frequency estimation unit 75-1 performs the same operation as the frequency estimation unit 25. Accordingly, an estimate $f_{est}$ of the carrier frequency offset calculated by the frequency estimation units 75-1 may be approximated to Formulas 44 and 45 when a total signal power used for estimation of the carrier frequency offset is sufficiently higher than a noise power.

[Formula 44]

$$\Delta f_{est} \approx \quad (44)$$

$$\Delta f + \frac{f_s}{2\pi \cdot \sqrt{\tau_1 \cdot N_1 \cdot \sum_{l=1}^{L}\sum_{m=1}^{M} |h_{ml}|^2}} \sqrt{\frac{1}{N_1} + \frac{1}{2\tau_1 \cdot \sum_{l=1}^{L}\sum_{m=1}^{M} |h_{ml}|^2}} \cdot \eta_\theta$$

[Formula 45]

$$\Delta f_{est} \approx \Delta f + \frac{f_s}{2\pi \cdot \tau_1 \cdot \sqrt{N_1 \cdot \sum_{l=1}^{L}\sum_{m=1}^{M} |h_{ml}|^2}} \sqrt{1 + \frac{1}{2 \cdot \sum_{l=1}^{L}\sum_{m=1}^{M} |h_{ml}|^2}} \cdot \eta_\theta \quad (45)$$

Formulas 42 and 43 are obtained by replacing $\Sigma|h_m|^2$ in Formulas 28 and 29 with $\Sigma\Sigma|h_{m1}|^2$. Generally, the complex amplitude response between the transmitting antenna and the receiving antenna is independently changed. Accordingly, a probability that $\Sigma\Sigma|h_{m1}|^2$ is equal to or smaller than a certain level is lower than a probability that $\Sigma|h_m|^2$ is equal to or smaller than the certain level. This is generally referred to as a reception diversity effect.

Thus, the method of estimating the carrier frequency offset in the third embodiment of the present invention can reduce the estimation error with the same training signal length and the same transmission power in the multi-path fading environment in comparison with the method of estimating the carrier frequency offset in the first embodiment. Also, the estimate with the same estimation error can be obtained with a shorter training signal length or a lower transmission power.

Figure 12:
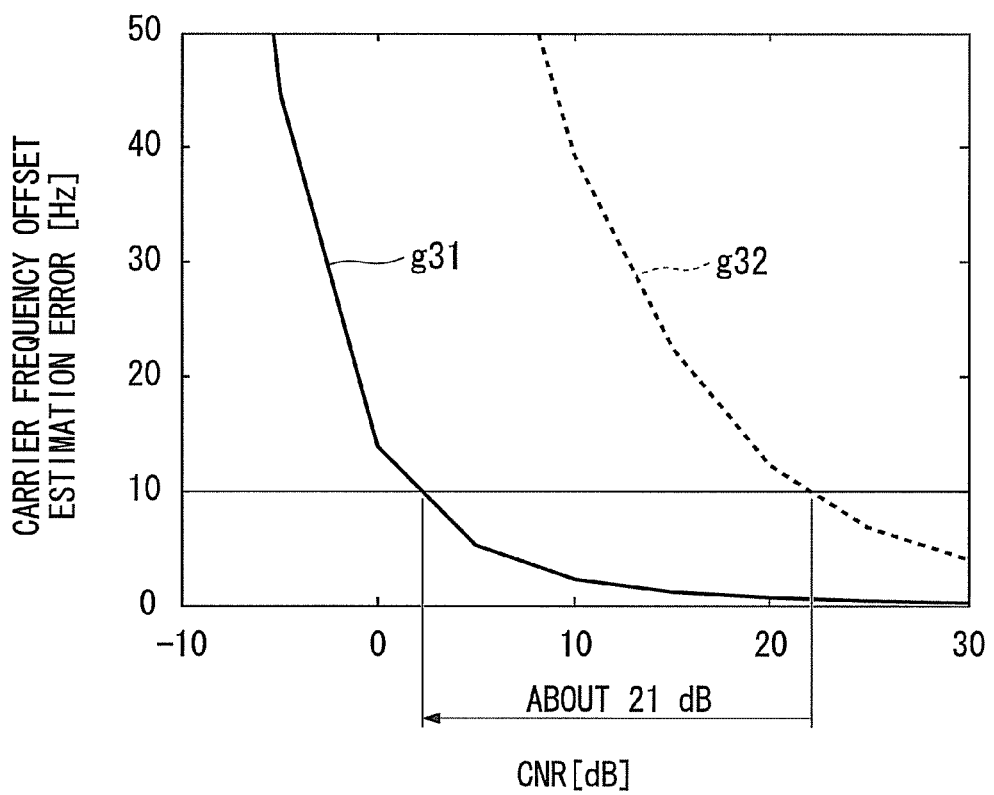
FIG. 12 is a flowchart showing a process in a transmission device 1 according to the third embodiment of the present invention.
Figure 13:
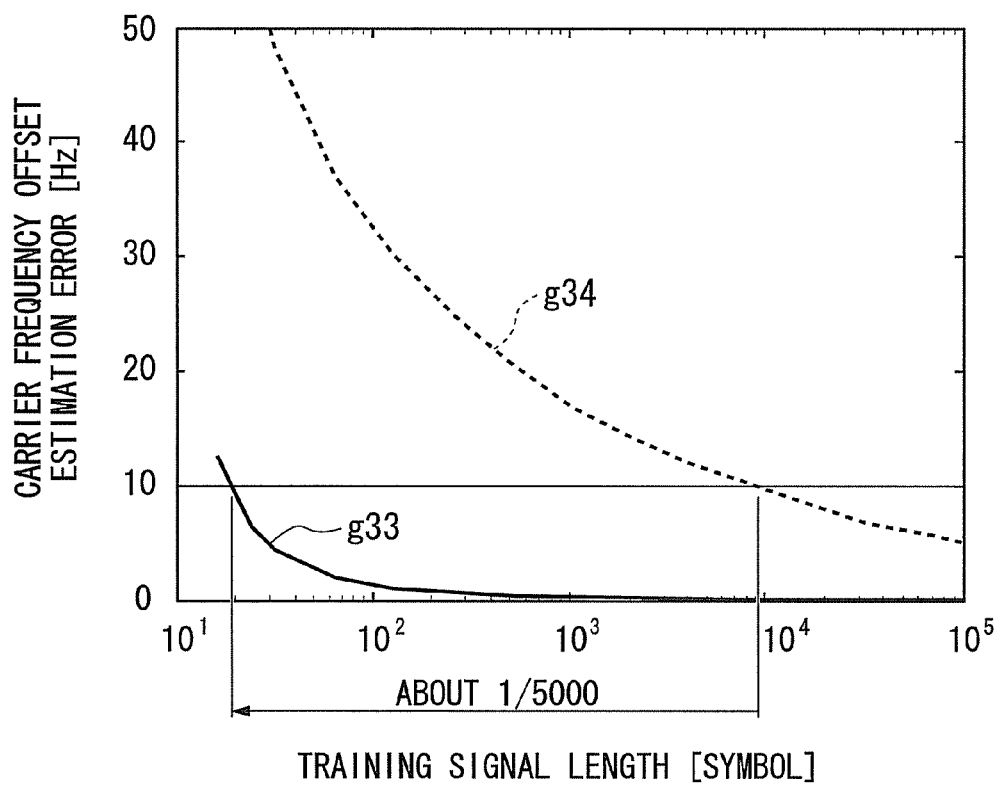
FIG. 13 is a flowchart showing the process in the transmission device 1 according to the third embodiment of the present invention.

Comparisons in carrier frequency offset estimation error properties between the technique of the third embodiment of the present invention and a conventional technique are shown in FIGS. 12 and 13. Here, the estimation error exhibits stochastic behavior. Accordingly, RMS was used for evaluation. A modulation rate was 9600 baud and a phase difference detection interval was 8 symbols. Further, in the third embodiment, a transmitting antenna number was 2 and a receiving antenna number was 2. A single-wave Rayleigh fading path independent for each antenna was also assumed as a propagation path.

In FIG. 12, a horizontal axis indicates CNR [dB]. A vertical axis indicates a carrier frequency offset estimation error [Hz]. In FIG. 12, a curve g31 shows a property when the technique of the third embodiment is used. A curve g32 shows a property when a conventional technique is used.

In FIG. 12, CNR was fixed to 10 dB and the training signal length was changed to evaluate the estimation error property. As a result of comparing training signal lengths required to obtain the estimation error of 10 Hz, the conventional technique required about 10000 symbols, whereas the technique of the third embodiment required about 20 symbols. That is, when the carrier frequency offset estimation error is 10 [Hz], the technique of the third embodiment allows the training signal length to be reduced to about 1/500 of the training signal length in the conventional technique.

Further, the technique of the third embodiment can reduce the training signal length to about 2/3 of the training signal length in the technique of the first embodiment.

In FIG. 13, a horizontal axis indicates a training signal length [symbols]. A vertical axis indicates a carrier frequency offset estimation error [Hz]. In FIG. 13, a curve g33 shows a property when the technique of the third embodiment is used. A curve g34 shows a property when a conventional technique is used.

In FIG. 13, a training signal length was fixed to 54 symbols and CNR was changed to evaluate the estimation error property. As a result of comparing CNRs required to obtain the estimation error of 10 [Hz], the conventional technique required about 23 dB, whereas the technique of the third embodiment required about 2 dB. That is, when the carrier frequency offset estimation error is 10 [Hz], the technique of the third embodiment allows the transmission power to be reduced to about 1/120 of the transmission power used in a conventional technique.

The technique of the third embodiment can reduce the transmission power to about 1/4 of the transmission power used in the technique of the first embodiment.

(Fourth Embodiment)

Hereinafter, a fourth embodiment of the present invention will be described with reference to the accompanying drawing.

Figure 14:
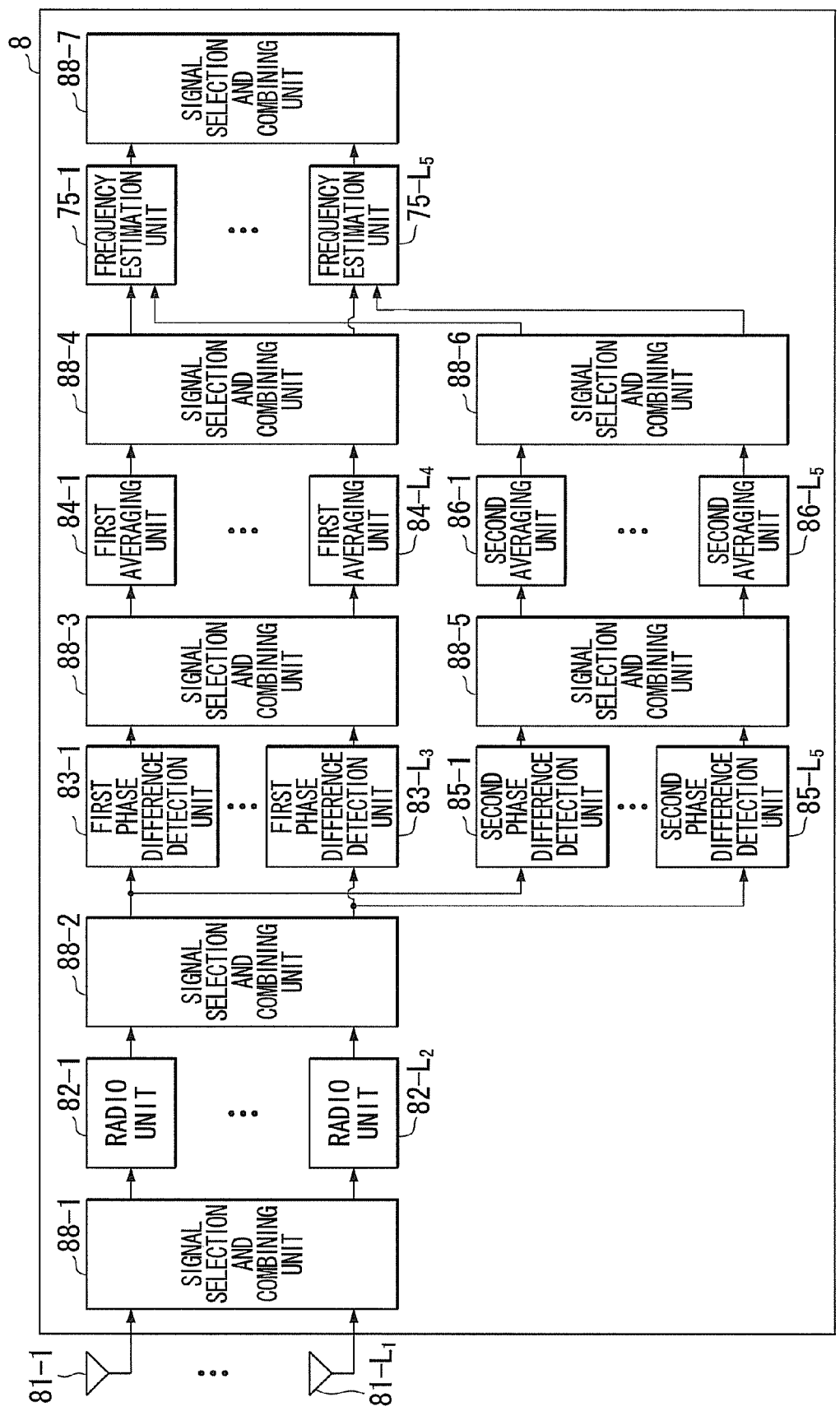
FIG. 14 is a schematic block diagram showing a reception device 8 according to a fourth embodiment of the present invention.
Figure 15:
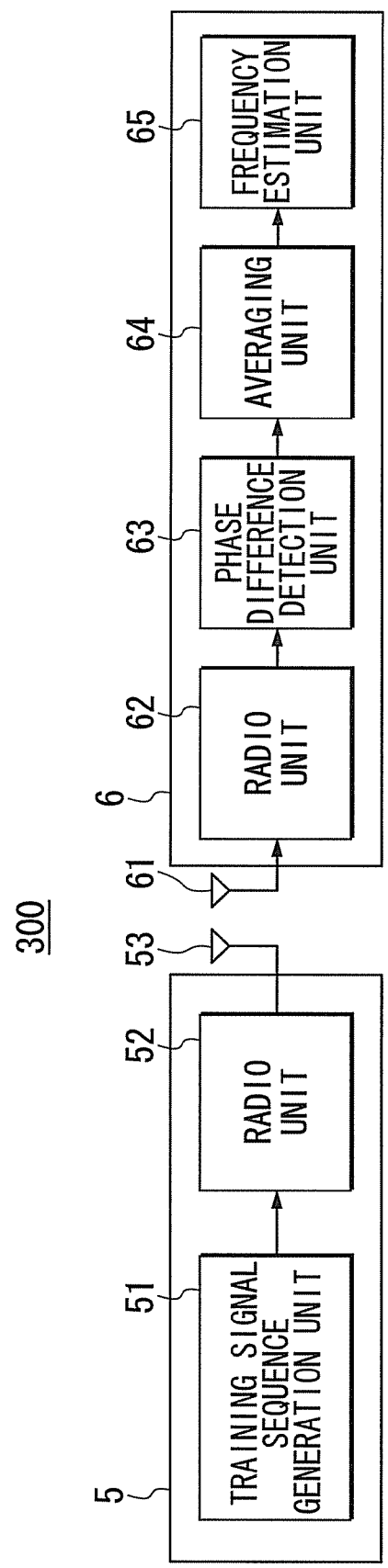
FIG. 15 is a block diagram showing a radio communication system 300 according to a conventional embodiment.

FIG. 14 is a schematic block diagram showing a reception device 8 according to the fourth embodiment of the present invention. A transmission device communicating with the reception device 8 is the same as the transmission device 3 in the second embodiment, and components, a connection of the components, and a signal flow are the same as those in the second embodiment.

The reception device 8 includes receiving antennas 81-1 to 81-$L_1$, radio units 82-1 to 82-$L_2$, first phase difference detection units 83-1 to 83-$L_3$, first averaging units 84-1 to 84-$L_4$, second phase difference detection units 85-1 to 85-$L_6$, second averaging units 86-1 to 86-$L_7$, frequency estimation units 75-1 to 75-$L_5$, and signal selection and combining units 88-1 to 88-7.

The receiving antennas 81-1 to 81-$L_1$ receive radio signals transmitted from the transmission device 3 and output the radio signals to the signal selection and combining unit 88-1.

The signal selection and combining unit 88-1 selects or combines the radio signals received by the receiving antennas 81-1 to 81-$L_1$ in order to avoid effects of noise by a reception diversity effect, and outputs resultant signals to the radio units 82-1 to 82-$L_2$.

The radio units 82-1 to 82-$L_2$ perform frequency conversion and digital conversion on the radio signal output by the signal selection and combining unit 88-1 to generate reception signals, and output the reception signals to the signal selection and combining unit 88-2.

The signal selection and combining unit 88-2 selects or combines the reception signals generated by the radio units 82-1 to 82-$L_2$ in order to avoid effects of noise by a reception diversity effect, and outputs resultant reception signals to the first phase difference detection units 83-1 to 83-$L_3$ and the second phase difference detection units 85-1 to 85-$L_6$.

The first phase difference detection units 83-1 to 83-$L_3$ compare the reception signal generated by the signal selection and combining unit 88-1 with a first previously determined sequence of training signals to detect physical amounts represented by a function of phase shift amounts in a time difference $T_1$, and output the physical amounts to the signal selection and combining unit 88-3.

The signal selection and combining unit 88-3 selects or combines the first physical amounts output from the first phase difference detection units 83-1 to 83-$L_3$ in order to avoid the effects of noise by the reception diversity effect, and outputs the first resultant physical amounts to the first averaging units 84-1 to 74-$L_4$.

The first averaging units 84-1 to 74-$L_4$ average the first physical amounts output from the signal selection and combining unit 88-3 in order to avoid effects of noise, and output first averaged physical amounts to the signal selection and combining unit 88-4.

The signal selection and combining unit 88-4 selects or combines the first averaged physical amounts output from the first averaging units 84-1 to 84-$L_4$ in order to avoid the effects of noise by the reception diversity effect, and outputs the first resultant averaged physical amounts to the frequency estimation units 75-1 to 75-$L_5$.

The second phase difference detection units 85-1 to 85-$L_6$ compare the reception signal generated by the signal selection and combining unit 88-1 with a second previously determined sequence of training signals to detect second physical amounts that are a function of a phase shift amount in a time difference $T_2$ that is shorter than the time difference $T_1$, and output the second physical amounts to the signal selection and combining unit 88-5.

The signal selection and combining unit 88-5 selects or combines the second physical amounts output from the second phase difference detection units 85-1 to 85-$L_6$ in order to avoid the effects of noise by the reception diversity effect, and outputs the second resultant physical amounts to the second averaging units 86-1 to 86-$L_7$.

The second averaging units 86-1 to 86-$L_7$ average the second physical amounts output from the signal selection and combining unit 88-5 in order to avoid the effects of noise, and output second averaged physical amounts to the signal selection and combining unit 88-6.

The signal selection and combining unit 88-6 selects or combines the second averaged physical amounts output from the second averaging units 86-1 to 86-$L_7$ in order to avoid the effects of noise by the reception diversity effect, and outputs the second resultant averaged physical amounts to the frequency estimation units 75-1 to 75-$L_5$.

The frequency estimation units 75-1 to 75-$L_5$ estimate carrier frequency offsets based on the first averaged physical amounts output from the signal selection and combining unit 88-4 and the second averaged physical amounts output from the signal selection and combining unit 88-6, and output the carrier frequency offsets to the frequency estimation units 75-1 to 75-$L_5$.

The signal selection and combining unit 88-7 selects or combines carrier frequency offsets estimated by the frequency estimation units 75-1 to 75-$L_5$ in order to avoid the effects of noise by the reception diversity effect.

In the present embodiment, when a receiving antenna number $L_1$ is 1 or when the receiving antenna number $L_1$ is equal to a radio unit number $L_2$, the signal selection and combining unit 88-1 may be omitted.

When the radio unit number $L_2$ is 1 or the radio unit number $L_2$ is equal to a first phase difference detection unit number $L_3$ and a second phase difference detection unit number $L_6$, the signal selection and combining unit 88-2 may be omitted.

When the first phase difference detection unit number $L_3$ is 1 or when the first phase difference detection unit number $L_3$ is equal to a first averaging unit number $L_4$, the signal selection and combining unit 88-3 may be omitted.

When the first averaging unit number $L_4$ is 1 or when the first averaging unit number $L_4$ is equal to a frequency estimation unit number $L_5$, the signal selection and combining unit 88-4 may be omitted.

When a second phase difference detection unit number $L_6$ is 1 or when the second phase difference detection unit number $L_6$ is equal to a second averaging unit number $L_7$, the signal selection and combining unit 88-5 may be omitted.

When the second averaging unit number $L_7$ is 1 or when the second averaging unit number $L_7$ is equal to the frequency estimation unit number $L_5$, the signal selection and combining unit 88-6 may be omitted.

When the frequency estimation unit number $L_5$ is 1, the signal selection and combining unit 88-7 may be omitted.

In the method of estimating a carrier frequency offset in the second embodiment of the present invention, the transmission diversity effect can be obtained since the transmitting antenna number is 2 or greater, but the reception diversity cannot be obtained since the receiving antenna number is 1.

In the fourth embodiment, a plurality of receiving antennas are provided in comparison with the second embodiment. The reception device 8 includes the signal selection and combining unit 88-1 for selecting or combining a plurality of radio signals received by the receiving antennas 81-1 to 81-$L_1$. The reception device 8 further includes the signal selection and combining unit 88-2 for selecting or combining the plurality of reception signals generated from the radio signals. The reception device 8 further includes the signal selection and combining units 88-3 and 88-5 for selecting or combining a plurality of first physical amounts that are represented as a function of the phase shift amounts calculated from the reception signal.

The reception device 8 further includes the signal selection and combining units 84-1 and 86-1 for selecting or combining the plurality of first averaged physical amounts obtained by averaging the first physical amounts represented by a function of a phase shift amount. The reception device 8 further includes the signal selection and combining units 88-4 and 88-6 for selecting or combining a plurality of second averaged physical amounts obtained by averaging the plurality of second physical amounts that are represented by a function of the phase shift amounts calculated from the reception signals and the second physical amounts that are represented by a function of the phase shift amounts. The reception device 8 further includes the signal selection and combining unit 88-7 for selecting or combining a plurality of carrier frequency offsets estimated from the first averaged physical amounts and the second averaged physical amounts.

Thus, the carrier frequency offset is estimated with high accuracy by the reception diversity effect, as in the third embodiment.

In addition, the carrier frequency offset estimation accuracy in the second embodiment of the present invention is the same as that in the third embodiment.

In the respective embodiments described above, the frequency offsets are properly assigned to the training signals by a previously determined signal sequence transmitted from the plurality of transmitting antennas. Thus, it is possible to avoid the degradation of the reception level. In addition, the degradation of estimation accuracy due to the frequency offset assignment can be avoided by detecting an appropriate phase difference using the sequence of training signals. Furthermore, even in the multi-path environment, it is possible to accurately estimate the carrier frequency offset with a small averaging sample number.

The present invention is not limited to the above embodiments, but may be changed without departing from the spirit and scope of the present invention. It is preferable that in the radio communication system of the present invention, the transmitting antennas of the transmission device are independent for each radio signal.

The present invention can be applied to a radio communication system in which a plurality of radio signals generated by a plurality of radio units (transmission units) are transmitted from the same transmitting antenna. In this case, a plurality of radio signals passes from the transmitting antenna to a receiving antenna. The effects of the present invention can be expected as long as propagation characteristics involving the antennas are not the same among all of a plurality of radio signals transmitted from the same transmitting antenna.

The transmission device of the present invention corresponds to the transmission device 1 and the transmission device 3.

The first training signal sequence generation unit of the present invention corresponds to the training signal sequence generation unit 11 and the first training signal sequence generation unit 31.

The first frequency offset assignment unit of the present invention corresponds to the frequency offset assignment units 12-1 to 12-M and the first frequency offset assignment units 32-1 to 32-M.

The transmission unit of the present invention corresponds to the radio units 13-1 to 13-M and the radio units 35-1 to 35-M.

The transmitting antennas of the present invention correspond to the transmitting antennas 14-1 to 14-M and the transmitting antennas 36-1 to 36-M.

Further, the first sequence of training signals of the present invention corresponds to the sequence of training signals previously determined in the first embodiment and the first sequence of training signals in the second embodiment.

The first physical amount of the present invention corresponds to the physical amount in the first embodiment and the first physical amount in the second embodiment.

The first averaged physical amount of the present invention corresponds to the averaged physical amount in the first embodiment and the first averaged physical amount in the second embodiment.

Further, the reception device of the present invention corresponds to the reception device 2 and the reception device 4.

The receiving antenna of the present invention corresponds to the receiving antenna 21 and the receiving antenna 41.

The receiving unit of the present invention corresponds to the radio unit 22 and the radio unit 42.

The first phase difference detection unit of the present invention corresponds to the phase difference detection unit 23 and the first phase difference detection unit 43.

The first averaging unit of the present invention corresponds to the averaging unit 24 and the first averaging unit 44.

The second phase difference detection unit of the present invention corresponds to the second phase difference detection unit 45.

The second averaging unit of the present invention corresponds to the second averaging unit 46.

The frequency estimation unit of the present invention corresponds to the frequency estimation unit 25 and the frequency estimation unit 47.

The selection and combining unit of the present invention corresponds to the signal selection and combining unit 76-1 to 76-5 and the signal selection and combining units 88-1 to 88-7.

INDUSTRIAL APPLICABILITY

The present invention can be applied to a radio communication system, a transmission device, a reception device, a radio communication method, a transmission method, a reception method and so on that accurately estimate the carrier frequency offset with a small averaging sample number in a multi-path environment.

DESCRIPTION OF REFERENCE NUMERALS

1: transmission device, 2: reception device, 3: transmission device, 4: reception device, 7: reception device, 7a: reception device, 8: reception device, 11: training signal sequence generation unit, 12-1 to 12-M: frequency offset assignment unit, 13-1 to 13-M: radio unit, 14-1 to 14-M: transmitting antenna, 21: receiving antenna, 22: radio unit, 23: phase difference detection unit, 24: averaging unit, 25: frequency estimation unit, 31: first training signal sequence generation unit, 32-1 to 32-M: first frequency offset assignment unit, 33: second training signal sequence generation unit, 34-1 to 34-M: second frequency offset assignment unit, 35-1 to 35-M: radio unit, 36-1 to 36-M: transmitting antenna, 41: receiving antenna, 42: radio unit, 43: first phase difference detection unit, 44: first averaging unit, 45: second phase difference detection unit, 46: second averaging unit, 47: frequency estimation unit, 71-1 to 71-$L_1$: receiving antenna, 72-1 to 72-$L_2$: radio unit, 73-1 to 73-$L_3$: phase difference detection unit, 74-1 to 74-$L_4$: averaging unit, 75-1 to 75-$L_5$: frequency estimation unit, 76-1 to 76-5: signal selection and combining unit, 81-1 to 81-$L_1$: receiving antenna, 82-1 to 82-$L_2$: radio unit, 83-1 to 83-$L_3$: first phase difference detection unit, 84-1 to 84-$L_4$: first averaging unit, 85-1 to 85-$L_6$: second phase difference detection unit, 86-1 to 86-$L_7$: second averaging unit, 75-1 to 75-$L_5$: frequency estimation unit, 88-1 to 88-7: signal selection and combining unit, 100: radio communication system, 200: radio communication system

The invention claimed is:

1. A radio communication system comprising a transmission device which transmits a plurality of radio signals, and a reception device which receives the plurality of radio signals from the transmission device and estimates, as a carrier frequency offset, a difference between a carrier frequency transmitted by the transmission device and a reference reception frequency used for reception, the radio communication system comprising:
the transmission device which branches a first previously determined sequence of training signals, and transmits the radio signals modulated with frequencies of the carrier frequency offsets having regularity for a first sequence of a plurality of branched training signals; and
the reception device which estimates the carrier frequency offset with the transmission device according to the first sequence of training signals included in the radio signals transmitted from the transmission device and phase shift amounts obtained from the first previously determined sequence of training signals.

2. A radio communication system comprising a transmission device which transmits a plurality of radio signals from a plurality of transmitting antennas, and a reception device which receives the plurality of radio signals from the transmission device using a receiving antenna and estimates, as a carrier frequency offset, a difference between a carrier frequency transmitted by the transmission device and a reference reception frequency used for reception,
wherein the transmission device comprises:
a first training signal sequence generation unit which generates a first previously determined sequence of training signals;
a first frequency offset assignment unit which assigns frequency offsets to respective frequencies assigned to the first sequence of training signals branched in the same number as the number of the plurality of transmitting antennas, the frequency offsets being integer times a frequency $f_1$; and
a transmission unit which transmits the radio signals including the first sequence of training signals having the frequency offsets assigned by the first frequency offset assignment unit to the reception device via the transmitting antennas, and
wherein the reception device comprises:
a receiving unit which receives the radio signals from the transmission device via the receiving antenna;
a first phase difference detection unit which detects first physical amounts dependent on phase shift amounts in a time difference $T_1$ that is natural number times a time represented by the reciprocal of the frequency $f_1$ based on the first sequence of training signals included in the radio signals transmitted from the transmission device and a first previously determined sequence of training signals;
a first averaging unit which calculates a first averaged physical amount by averaging the first physical amounts; and
a frequency estimation unit which estimates the carrier frequency offset based on the first averaged physical amount.

3. The radio communication system according to claim 2, wherein the transmission device further comprises:
a second training signal sequence generation unit which generates a second previously determined sequence of training signals; and
a second frequency offset assignment unit which assigns frequency offsets of which absolute values are smaller than half the reciprocal of a time difference $T_1$, to respective frequencies assigned to the second sequence of training signals branched in the same number as the number of the plurality of transmitting antennas,
wherein the transmission unit multiplexes the first sequence of training signals having the frequency offsets assigned by the first frequency offset assignment unit and the second sequence of training signals having the frequency offsets assigned by the second frequency offset assignment unit, and transmits the resultant signals as the radio signals to the reception device via the transmitting antennas, wherein the reception device further comprises:
a second phase difference detection unit which detects second physical amounts dependent on phase shift amounts in a time difference $T_2$ that is shorter than the time difference $T_1$ based on the second sequence of training signals included in the radio signals transmitted from the transmission device and a second previously determined sequence of training signals; and
a second averaging unit which calculates a second averaged physical amount by averaging the second physical amounts, and
wherein the frequency estimation unit estimates the carrier frequency offset based on the first averaged physical amount and the second averaged physical amount.

4. The radio communication system according to claim 3, wherein the second frequency offset assignment unit assigns the frequency offsets so that an absolute value of a difference between all the assigned frequency offsets is an integer times the frequency $f_2$, and
wherein the second averaging unit averages the second physical amounts in a range of times that are natural number times the reciprocal of the frequency $f_2$.

5. A transmission device which transmits a plurality of radio signals from a plurality of transmitting antennas, the transmission device comprising:
a first training signal sequence generation unit which generates a first previously determined sequence of training signals;
a first frequency offset assignment unit which assigns frequency offsets to respective frequencies assigned to the first sequence of training signals branched in the same number as the number of the plurality of transmitting antennas, the frequency offsets being integer times a frequency $f_1$; and
a transmission unit which transmits the radio signals including the first sequence of training signals having the frequency offsets assigned by the first frequency offset assignment unit to the reception device via the transmitting antennas.

6. The transmission device according to claim 5, further comprising:
a second training signal sequence generation unit which generates a second previously determined sequence of training signals; and
a second frequency offset assignment unit which assigns frequency offsets of which absolute values are smaller than half of the reciprocal of a time difference $T_1$, to frequencies assigned to the second sequence of training signals branched in the same number as the number of the plurality of transmitting antennas,
wherein the transmission unit multiplexes the first sequence of training signals having the frequency offsets assigned by the first frequency offset assignment unit and the second sequence of training signals having the frequency offsets assigned by the second frequency offset assignment unit, and transmits the resultant signals as the radio signals to the reception device via the transmitting antennas.

7. The transmission device according to claim 6,
wherein the second frequency offset assignment unit assigns the frequency offsets so that an absolute value of a difference between all the assigned frequency offsets is an integer times a frequency $f_2$.

8. A reception device that communicates with a transmission device which assigns frequency offsets that are integer times a frequency $f_1$ to respective frequencies assigned to a first sequence of branched training signals to transmit a plurality of radio signals from a plurality of transmitting antennas, receives the plurality of radio signals from the transmission device using a receiving antenna, and estimates, as a carrier frequency offset, a difference between a carrier frequency transmitted by the transmission device and a reference reception frequency used for reception, the reception device comprising:
a receiving unit which receives the radio signals from the transmission device via the receiving antenna;
a first phase difference detection unit which detects first physical amounts dependent on phase shift amounts in a time difference $T_1$ that is a natural number times a time represented by the reciprocal of the frequency $f_1$ based on the first sequence of training signals included in the radio signals transmitted from the transmission device and a first previously determined sequence of training signals;
a first averaging unit which calculates a first averaged physical amount by averaging the first physical amounts; and
a frequency estimation unit which estimates a carrier frequency offset based on the first averaged physical amount.

9. The reception device according to claim 8,
wherein the reception device communicates with a transmission device which multiplexes and transmits a second sequence of training signals having frequency offsets of which absolute values are smaller than half of the reciprocal of a time difference T1, for respective frequencies assigned to a second sequence of branched training signals, and the first sequence of training signals,
the reception device further comprising:
a second phase difference detection unit which detects second physical amounts dependent on phase shift amounts in a time difference $T_2$ that is shorter than the time difference $T_1$ based on the second sequence of training signals included in the radio signals transmitted from the transmission device and a second previously determined sequence of training signals; and
a second averaging unit which calculates a second averaged physical amount by averaging the second physical amounts,
wherein the frequency estimation unit estimates the carrier frequency offset based on the first averaged physical amount and the second averaged physical amount.

10. The reception device according to claim 9,
wherein the reception device communicates with a transmission device which assigns the frequency offset so that an absolute value of a difference between all the assigned frequency offsets is an integer times the frequency $f_2$, and
wherein the second averaging unit averages the second physical amounts in a range of times that are natural number times the reciprocal of the frequency $f_2$.

11. The reception device according to claim 9,
wherein the second phase difference detection unit calculates the second physical amounts by subtracting a phase shift amount in the time difference of the second previously determined sequence of training signals from a phase shift amount in a time difference $T_2$ of the second sequence of training signals included in the radio signals transmitted from the transmission device.

12. The reception device according to claim 9,
wherein the second phase difference detection unit calculates the second physical amounts by multiplying from a delay detection result in a time difference $T_2$ of the second sequence of training signals included in the radio signals transmitted from the transmission device by a conjugate complex of a delay detection result in the time difference of the second previously determined sequence of training signals.

13. The reception device according to claim 8, wherein the first phase difference detection unit calculates the first physical amounts by subtracting a phase shift amount in the time difference of the first previously determined sequence of training signals from a phase shift amount in a time difference $T_1$ of the first sequence of training signals included in the radio signals transmitted from the transmission device.

14. The reception device according to claim 8, wherein the first phase difference detection unit calculates the first physical amounts by multiplying a conjugate complex of a delay detection result in the time difference $T_1$ of the first sequence of training signals included in the radio signals transmitted from the transmission device by a conjugate complex of a delay detection result in the time difference of the first previously determined sequence of training signals.

15. The reception device according to claim 8, wherein the first averaging unit calculates the first averaged physical amount by averaging the first physical amounts in a range of times that are natural number times a time represented by the reciprocal of the frequency $f_1$.

16. The reception device according to claim 8, comprising a plurality of at least one of the receiving unit, the first phase difference detection unit, the first averaging unit, and the frequency estimation unit,
wherein the reception device comprises a signal selection and combining unit which selects or combines a plurality of signals output by the at least one of the receiving unit, the first phase difference detection unit, the first averaging unit, and the frequency estimation unit, and outputting resultant signals.

17. A radio communication method using a transmission device which transmits a plurality of radio signals, and a reception device which receives the plurality of radio signals from the transmission device and estimates, as a carrier frequency offset, a difference between a carrier frequency transmitted by the transmission device and a reference reception frequency used for reception,
wherein the transmission device branches a first previously determined sequence of training signals, and transmits the radio signals modulated with frequencies by the carrier frequency offsets having regularity for a first sequence of a plurality of branched training signals, and
wherein the reception device estimates the carrier frequency offset with the transmission device according to the first sequence of training signals included in the radio signals transmitted from the transmission device and phase shift amounts obtained from the first previously determined sequence of training signals.

18. A radio communication method using a transmission device which transmits a plurality of radio signals from a plurality of transmitting antennas, and a reception device which receives the plurality of radio signals from the transmission device using a receiving antenna and estimates, as a carrier frequency offset, a difference between a carrier frequency transmitted by the transmission device and a reference reception frequency used for reception,
wherein the transmission device carries out:
a first training signal sequence generation process which generates a first previously determined sequence of training signals;
a first frequency offset assignment process which assigns frequency offsets to respective frequencies assigned to the first sequence of training signals branched in the same number as the number of the plurality of transmitting antennas, the frequency offsets being integer times a frequency $f_1$; and
a transmission process which transmits the radio signals including the first sequence of training signals having the frequency offsets assigned in the first frequency offset assignment process to the reception device via the transmitting antennas, and
wherein the reception device carries out:
a receiving process which receives the radio signals from the transmission device via the receiving antenna;
a first phase difference detection process which detects first physical amounts dependent on phase shift amounts in a time difference $T_1$ that is natural number times a time represented by the reciprocal of the frequency $f_1$ based on the first sequence of training signals included in the radio signals transmitted from the transmission device and a first previously determined sequence of training signals;
a first averaging process which calculates a first averaged physical amount by averaging the first physical amounts; and
a frequency estimation process which estimates the carrier frequency offset based on the first averaged physical amount.

19. The radio communication method according to claim 18,
wherein the transmission device further carries out:
a second training signal sequence generation process which generates a second previously determined sequence of training signals; and
a second frequency offset assignment process which assigns frequency offsets of which absolute values are smaller than half the reciprocal of a time difference $T_1$, to respective frequencies assigned to the second sequence of training signals branched in the same number as the number of the plurality of transmitting antennas,
the transmission process including multiplexing the first sequence of training signals having the frequency offsets assigned in the first frequency offset assignment process and the second sequence of training signals having the frequency offsets assigned in the second frequency offset assignment process, and transmitting the resultant signals as the radio signals to the reception device via the transmitting antennas, and
wherein the reception device further carries out:
a second phase difference detection process which detects second physical amounts dependent on phase shift amounts in a time difference $T_2$ that is shorter than the time difference $T_1$ based on the second sequence of training signals included in the radio signals transmitted from the transmission device and a second previously determined sequence of training signals; and
a second averaging process which calculates a second averaged physical amount by averaging the second physical amounts,
the frequency estimation process including estimating the carrier frequency offset based on the first averaged physical amount and the second averaged physical amount.

20. The radio communication method according to claim 19,
- wherein the second frequency offset assignment process comprises assigning the frequency offsets so that an absolute value of a difference between all the assigned frequency offsets is an integer times the frequency $f_2$, and
- wherein the second averaging process comprises averaging the second physical amounts in a range of times that are natural number times the reciprocal of the frequency $f_2$.

21. A transmitting method using a transmission device which transmits a plurality of radio signals from a plurality of transmitting antennas, the transmission method comprising:
- a first training signal sequence generation process which generates a first previously determined sequence of training signals;
- a first frequency offset assignment process which assigns frequency offsets to respective frequencies assigned to the first sequence of training signals branched in the same number as the number of the plurality of transmitting antennas, the frequency offsets being integer times a frequency $f_1$; and
- a transmission process which transmits the radio signals including the first sequence of training signals having the frequency offsets assigned in the first frequency offset assignment process to the reception device via the transmitting antennas.

22. A receiving method using a reception device that communicates with a transmission device which assigns frequency offsets that are integer times a frequency $f_1$ to respective frequencies assigned to a first sequence of branched training signals to transmit a plurality of radio signals from a plurality of transmitting antennas, receives the plurality of radio signals from the transmission device using a receiving antenna, and estimates, as a carrier frequency offset, a difference between a carrier frequency transmitted by the transmission device and a reference reception frequency used for reception, the receiving method comprising:
- a reception process which receives the radio signals from the transmission device via the receiving antenna;
- a first phase difference detection process which detects first physical amounts dependent on phase shift amounts in a time difference $T_1$ that is a natural number times a time represented by the reciprocal of the frequency $f_1$ based on the first sequence of training signals included in the radio signals transmitted from the transmission device and a first previously determined sequence of training signals;
- a first averaging process which calculates a first averaged physical amount by averaging the first physical amounts; and
- a frequency estimation process which estimates a carrier frequency offset based on the first averaged physical amount.

* * * * *